(12) United States Patent
Lu et al.

(10) Patent No.: US 11,285,437 B2
(45) Date of Patent: Mar. 29, 2022

(54) SYSTEMS AND METHODS FOR CARBON CAPTURE

(71) Applicant: 8 Rivers Capital, LLC, Durham, NC (US)

(72) Inventors: Xijia Lu, Durham, NC (US); Brock Alan Forrest, Durham, NC (US); Jeremy Eron Fetvedt, Raleigh, NC (US); Navid Rafati, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 16/864,944

(22) Filed: May 1, 2020

(65) Prior Publication Data

US 2020/0346165 A1    Nov. 5, 2020

Related U.S. Application Data

(60) Provisional application No. 62/965,405, filed on Jan. 24, 2020, provisional application No. 62/936,723, (Continued)

(51) Int. Cl.
*B01D 5/00* (2006.01)
*B01D 53/62* (2006.01)
(Continued)

(52) U.S. Cl.
CPC ......... *B01D 53/62* (2013.01); *B01D 5/0072* (2013.01); *B01D 5/0075* (2013.01); *B01D 53/96* (2013.01); *C01B 32/55* (2017.08); *B01D 2251/606* (2013.01); *B01D 2257/504* (2013.01); *B01D 2258/0283* (2013.01)

(58) Field of Classification Search
None
See application file for complete search history.

(56) References Cited

U.S. PATENT DOCUMENTS 4,110,121 A * 8/1978 Rechmeier ............... F27B 9/34
106/745
6,488,765 B1   12/2002 Tseng et al.
(Continued)

FOREIGN PATENT DOCUMENTS

CN    102309917    1/2012
EP     1092692     4/2001
(Continued)

OTHER PUBLICATIONS

CEMCAP Presentation, "Preparing the Ground for CCS in the European Cement Industry—CEMCAP Status", 2017, pp. 1-9.

*Primary Examiner* — Daniel Berns
(74) *Attorney, Agent, or Firm* — Womble Bond Dickinson (US) LLP

(57) ABSTRACT

The present disclosure provides systems for carbon capture in combination with production of one or more industrially useful materials. The disclosure also provides methods for carrying out carbon capture in combination with an industrial process. In particular, carbon capture can include carrying out calcination in a reactor, separation of carbon dioxide rich flue gases from industrially useful products, and capture of at least a portion of the carbon dioxide for sequestration of other use, such as enhanced oil recovery.

32 Claims, 8 Drawing Sheets

Related U.S. Application Data filed on Nov. 18, 2019, provisional application No. 62/843,012, filed on May 3, 2019.

(51) Int. Cl.
  *C01B 32/55* (2017.01)
  *B01D 53/96* (2006.01)

(56) References Cited

U.S. PATENT DOCUMENTS

| | | | |
|---|---|---|---|
| 7,976,628 B2 | 7/2011 | Blount et al. | |
| 8,807,993 B2 | 8/2014 | Sceats et al. | |
| 2008/0241036 A1* | 10/2008 | Laslo | B01D 53/18 423/243.01 |
| 2010/0068109 A1 | 3/2010 | Comrie | |
| 2015/0343373 A1 | 12/2015 | Balfe et al. | |
| 2017/0050883 A1 | 2/2017 | Sceats | |
| 2020/0009527 A1* | 1/2020 | Weissman | B01J 20/3078 |

FOREIGN PATENT DOCUMENTS

| | | |
|---|---|---|
| EP | 2559472 | 2/2013 |
| EP | 2614877 | 7/2013 |
| EP | 3231779 | 10/2017 |
| JP | 2011-168459 | 9/2011 |
| WO | WO 2010/104989 | 9/2010 |

* cited by examiner

SYSTEMS AND METHODS FOR CARBON CAPTURE

CROSS-REFERENCE TO RELATED APPLICATIONS

The present application claims priority to U.S. Provisional Patent Application No. 62/843,012, filed May 3, 2019, U.S. Provisional Patent Application No. 62/936,723, filed Nov. 18, 2019, and U.S. Provisional Patent Application No. 62/965,405, filed Jan. 24, 2020, the disclosures of which are incorporated herein by reference.

FIELD OF THE DISCLOSURE

The present disclosure relates to systems and methods for capture and optional purification of one or more moieties from a provided stream, particularly with capture of at least carbon dioxide.

BACKGROUND

Many technologies enabling carbon capture from calcination/cement plants have been invented by different groups, including oxy-combustion cement processes, calcium looping processes, post-combustion capture via membrane separation, and other solvent based separation processes. No known technologies include complete process integration between the carbon capture technologies (such as a calcination/cement operation) and the power required to enable it (including $CO_2$ capture from calcination, fuel combustion, and electricity consumption) as well the purification of the $CO_2$ stream that has been captured. Furthermore, the capture of carbon emissions not originating from kiln based calcination activities typically requires an external reactor known as a carbonator in order to enable calcium looping as a parallel function. In addition, processes for NOx/SOx removal from calcination/cement plants flue gas and adjacent external emissions are not included in the existing technologies.

Calcination related industrial processes, such as lime and cement production, are some of the world's most energy and $CO_2$ intensive industrial production processes. In a 2013 report, emissions from cement production process were estimated to account for nearly 5% of the world's total anthropogenic $CO_2$ emissions. Different from power generation, $CO_2$ is produced not only from the combustion of fossil fuels, but also from the calcination of raw meal (which contains 70-80 wt. % $CaCO_3$). This calcination produces the largest share of $CO_2$ emissions of the process, around 60%. $CO_2$ from fossil fuels combustion, electricity, and transportation represents 40% of the total $CO_2$ emissions in the cement process. In total, the production of one kg of cement releases about 0.6-0.7 kg of $CO_2$. Currently, the International Energy Agency (IEA) has a goal set wherein 50% of all cement plants in Europe, Northern America, Australia and East Asia will apply carbon capture and storage (CCS) by 2050.

SUMMARY OF THE DISCLOSURE

The present disclosure provides systems useful for capturing carbon dioxide while also providing one or more industrially useful products, such as cement, steel, quicklime, and electrical power. The present disclosure further provides methods utilizing such systems. As such, it is possible according to the present disclosure to provide quicklime and other industrial products that are substantially or completely "carbon dioxide-free" in that the quicklime and other industrial products can be formed in a manner wherein substantially no carbon dioxide or completely no carbon dioxide is released to the atmosphere. The quicklime and other industrial products that are available for use in a variety of industries (e.g., cement, steel, electrical power generation, etc.) without adding carbon output to the environment.

In one or more embodiments, the present disclosure can provide systems that are useful for calcination of one or more materials while also providing for carbon capture, particularly capture of at least a portion of any carbon dioxide that is produced from the system. In example embodiments, such systems can be specifically useful for calcination of a carbonate-containing raw material, such as a calcium carbonate ($CaCO_3$) containing material, and more particularly limestone. The systems may include: a reactor configured to heat a carbonate-containing raw material in the presence of an oxidant to form a decomposition stream containing at least solids and carbon dioxide gas; a separator configured to separate the decomposition stream into a gas stream including the carbon dioxide gas and a solids stream; a heat exchange unit configured to receive one or both the gas stream including the carbon dioxide gas and the solid stream and withdraw heat therefrom to provide a cooled gas stream including the carbon dioxide and a cooled solids stream; and a $CO_2$ separation unit configured to separate the cooled gas stream into a $CO_2$ lean stream and a $CO_2$ rich stream. The systems may be further defined in relation to one or more of the following statements, which may be combined in any order or number.

The reactor and the separator may be combined as a single unit. Alternatively, the reactor and the separator may be individual units that are interconnected through one or more lines. For example, one or more outlets of one or more reactors may be in communication with one or more inlets of one or more separators. Likewise, a plurality of reactors may be utilized as a reactor unit and/or a plurality of separators may be used as a separation unit.

The systems further can comprise one or more oxygen-forming unit(s) configured to provide oxygen to the reactor. Alternatively, or additionally, oxygen may be provided to the reactor as part of a mixed gas stream. For example, a flue gas from a power production plant may be directed to the reactor to provide all or part of the necessary oxidant in the reactor. As such, the present systems may be integrated with a power plant or other system that is configured to provide an oxygen-containing gas, and the system may include one or more lines interconnecting the power plant or other gas-producing plant with the reactor of the present systems.

The present systems further may comprise a water separator downstream from the heat exchanger. Further, a plurality of water removing components may be used and may be provided separately or as a single unit. As such, a plurality of water removing components may be provided in sequence.

The $CO_2$ separation unit can comprise at least one membrane separation stage configured to separate the cooled gas stream including the carbon dioxide into the $CO_2$ lean stream and the $CO_2$ rich stream. Further, the system may include a low temperature $CO_2$ purification unit configured to receive at least the $CO_2$ rich stream from the at least one membrane separation stage. Additionally, the system may include one or more compression units. For example, a compression unit may be configured to compress the cooled gas stream including the carbon dioxide. In particular, the compression unit can be positioned upstream from the at least one membrane separation stage. If desired, the system likewise can include an expander positioned downstream from the at least one membrane separation stage.

The systems further may comprise a carbon dioxide membrane separator positioned downstream of the compression unit and upstream from the $CO_2$ separation unit. The carbon dioxide membrane separator may be configured to exhibit a defined performance level. For example, the carbon dioxide membrane separator may be configured to provide at least 50% bulk recovery of $CO_2$ from the incoming gas stream and output a permeate product including the carbon dioxide.

An expander may be positioned downstream from the carbon dioxide membrane separator. The expander can be useful to cool the permeate product and may be utilized as part of a cryogenic $CO_2$ separation unit.

The system can further comprise a power generation cycle integrated with the heat exchanger. For example, the power generation cycle can comprise a compression unit configured to provide a compressed working fluid to an inlet of the heat exchanger, a turbine configured to receive the compressed working fluid from an outlet of the heat exchanger, and a cooler positioned between, and in fluid connection, with an outlet of the turbine and an inlet of the compression unit. A generator or other suitable power-producing component can be included in the power generation cycle to, for example, produce electricity.

The system can further comprise a carbonator configured to receive a portion of the solids stream from the separator. Alternatively, or additionally, the carbonator may be configured to receive at least a portion of the gas stream including the carbon dioxide from the separator.

The carbonator can include a solid product outlet in communication with an inlet of the reactor and can be configured for delivery of regenerated raw material to the reactor. For example, when limestone ($CaCO_3$) is utilized as the raw material in the reactor, the solids that are produced can include quicklime (CaO). In the carbonator, the quicklime can be reacted with a carbon dioxide-containing stream to produce $CaCO_3$, which can be recycled back to the reactor. The carbon dioxide-containing stream can be, for example, an industrial flue gas that can be taken from an existing power plant, lime production plant, cement plant, steel plant, and/or other industrial process. In this manner, the present system may be physically integrated with a further system for processing of the carbon dioxide-containing stream taken from the further system.

The system further can comprise a clinker unit configured to receive a portion of the solids stream from the separator. The clinker unit may be configured for formation of cement clinker, for example. Accordingly, the clinker unit can include one or more inlets configured for entry of one or more raw materials. The raw materials particularly may be materials suitable for formation of cement clinker when combined with quicklime.

The system likewise may further comprise a clinker cooler unit configured to receive a stream of cement clinker from the clinker unit and cool the stream of cement clinker with a portion of the cooled gas stream from the compression unit. A cement clinker product suitable for forming cement may thus be exported from the system.

The system, in one or more embodiments, may be specifically configured to be integrated with a steel-making plant. In particular, the reactor may be configured to receive one or more streams from the steelmaking plant, such as a fuel gas stream (e.g., a coke oven gas stream, a blast furnace gas stream, and/or a basic oxygen furnace gas stream). Likewise, the system may be configured such that solids from the reactor (or the separator) may be delivered to one or more components of the steelmaking system (e.g., a blast furnace and/or a basic oxygen furnace). Further, an oxygen source may be shared between one or more components of the steelmaking system and the reactor in the present system.

The system similarly may be integrated with a power production plant. For example, a line may be utilized to direct flue gas from the power production plan to the reactor of the present system. Alternatively, or additionally, coal ash from a power production plant may be processed through the present system.

The system particularly can further include an ash burning unit. The ash burning unit can be a reburner to provide thermally treated ash that has a low loss on ignition. Such treated ash may then be delivered for formation of other products, such as cement, concrete, fly ash bricks, aggregates, and the like. Similarly, the system can be configured to deliver a portion of the produced solids (e.g., quicklime) for mixing with high moisture ash to reduce the moisture level thereof and provide ash that is suitable for downstream uses, such as noted above. Likewise, a portion of the solids can be exported and optionally mixed with ash.

In one or more embodiments, the present disclosure can provide methods or processes that are likewise useful for calcination of one or more materials while also providing for carbon capture, particularly capture of at least a portion of any carbon dioxide that is produced from the processes. In example embodiments, such methods or processes can be specifically useful for calcination of a carbonate-containing raw material, such as a calcium carbonate ($CaCO_3$) containing material, and more particularly limestone. Particularly, such methods can comprise: processing a carbonate-containing raw material in a heated reactor to provide a decomposition stream comprising at least solids and carbon dioxide gas; separating the decomposition stream in a separation unit into a gas stream including the carbon dioxide and a solids stream; cooling one or both of the gas stream including the carbon dioxide and the solids stream in a heat exchanger; one or both of providing at least a portion of the solids stream as a product for export and delivering at least a portion of the solids stream to a further reactor for forming a secondary product; and purifying the gas stream including the carbon dioxide to provide a substantially pure stream of carbon dioxide for export. The methods may be further defined in relation to one or more of the following statements, which may be combined in any order or number.

A decomposition stream produced according to the present methods particularly indicates that the stream contains one or more compounds or materials that arise from calcination of the raw material where the raw material is broken down into constituent parts. For example, calcination of $CaCO_3$ produces carbon dioxide gas and calcium oxide solids, and calcination of types of raw materials, particularly other carbonate-containing materials, may likewise produce a solids component and a carbon dioxide-containing gas.

The reactor in the present methods may be operated at an increased pressure (i.e., greater than ambient pressure), and such pressure particularly may be in the range of about 1.5 bar to about 8 bar.

The reactor likewise may be operated at an increased temperature, such as about 850° C. to about 1100° C.

The reactor may be heated through combustion in the reactor of a fuel with oxygen.

The oxidant can comprise substantially pure oxygen provided by one or more oxygen production units. Alternatively, or additionally, the oxidant can comprise oxygen that is present in a mixed gas stream such as a flue gas. For example, a flue gas from a power production plant can be a mixed gas stream that includes oxygen, and carbon dioxide in the flue gas can be captured as a result of being introduced into the present methods.

The heated reactor and the separation unit can be an integral unit. Alternatively, the heated reactor and the separation unit can be independent units. Likewise, a plurality of reactors may be used in a reactor unit, and/or a plurality of separators may be utilized in a separation unit.

The heat exchanger can be one or more of a heat recovery steam generator (HRSG), a gas heated reformer (GHR), or a recuperative heat exchanger. Likewise, a plurality of individual heat exchangers may be combined.

The gas stream including the carbon dioxide can be cooled in the heat exchanger(s) to a temperature of about 20° C. to about 150° C.

The method further can comprise passing the gas stream including the carbon dioxide that is exiting the heat exchanger through one or more water removal units to provide a dried gas stream including the carbon dioxide.

The method can be configured such that purifying the gas stream including the carbon dioxide can comprise passing the gas stream including the carbon dioxide through at least one membrane separation stage configured to separate the gas stream including the carbon dioxide into a $CO_2$ lean stream and a $CO_2$ rich stream. In such embodiments, it can be preferable to pass at least the $CO_2$ rich stream through a low temperature $CO_2$ purification unit. Optionally, the $CO_2$ lean stream may also be passed through the low temperature $CO_2$ purification unit.

The method further can comprise compressing the gas stream including the carbon dioxide upstream from the at least one membrane separation stage. This can include, in some embodiments, pressurizing the gas stream including the carbon dioxide to a pressure of about 3 bar to about 15 bar to provide a pressurized gas stream including the carbon dioxide. Pressurization can utilize one or more compression stages. When multiple compression stages are used, it can be preferred to utilize intercooling to remove the heat of compression after one or more of the pressurization stages.

When pressurization is utilized, the method further can comprise expanding at least the $CO_2$ rich stream downstream from the at least membrane separation stage. If desired, the $CO_2$ lean stream likewise can be expanded.

In some embodiments, the at least one membrane separation unit can be configured to provide at least 50% bulk recovery of $CO_2$ from the gas stream including the carbon dioxide in the $CO_2$ rich stream. Preferably, the $CO_2$ rich stream can have a $CO_2$ concentration no lower than 50%.

The method further can comprise carrying out a power production cycle that it integrated with the heat exchanger. For example, the power production cycle can comprise compressing a working fluid in a compression unit to provide a compressed working fluid, heating the compressed working in the heat exchanger, passing the compressed working fluid exiting the heat exchanger through a turbine to generate power and form an expanded working fluid, and passing the expanded working fluid back to the compression unit. A generator or other suitable power-producing component can be included in the power generation cycle to, for example, produce electricity.

The method further can comprise processing a portion of the solids stream exiting the separator in a carbonator. For example, the carbonator can be configured to provide a regenerated raw material, and at least a portion of the regenerated raw material can be recycled back to the reactor. In example embodiments, the raw material can be limestone ($CaCO_3$), and the solids steam exiting the reactor can comprise quicklime (CaO). The method likewise can comprise processing a flue gas including carbon dioxide through the carbonator such that at least a portion of the carbon dioxide from the flue gas is reacted with the quicklime to form $CaCO_3$. The limestone then can be the regenerated raw material that is sent back to the reactor.

The quicklime that is produced in a method utilizing limestone as a raw material for calcination thus can be cycled in the method as a carbon capture substrate. Such looping processes are known, but utilization of such looping has been problematic in the art since the quicklime rapidly loses its activity for carbon capture. In the present methods, this problem is overcome by separating the produced quicklime into an export fraction and a carbonation fraction (i.e., a portion that is sent to the carbonator to capture carbon dioxide as noted above). The methods preferably can be configured such that an export to carbonation ratio range is utilized. By implementing such ratio, quicklime is constantly being removed from the system, and the possibility of the "same" CaO particles repeatedly being recycled through the carbonator and the calcination reactor enough times to deactivate the CaO below a desired activity level is statistically limited. In some embodiments, this is achieved by configuring the methods so that the ratio of the export CaO to the CaO entering the carbonator is preferably in the range of about 5:1 to about 0.5:1. The ratio may be narrowed based upon the further parameters of the method, and further useful ratio ranges can be about 4:1 to about 1:1 or about 4:1 to about 2:1 or about 3:1 to about 1:1.

The method further can comprise processing a portion of the solids stream exiting the separator in a clinker unit. For example, the method can comprise adding one or more raw materials effective for cement production into the clinker unit such that solids from the solids stream react with the one or more raw materials effective for cement production to form cement clinker. This can be particularly useful when the solids stream includes quicklime, and the added raw materials in the clinker unit can include sand, coal ash, or other materials suitable for cement production. As such, the clinker unit can be a clinker unit from a conventional cement production plant, and the clinker unit may be operated under substantially similar conditions as would be used in a conventional cement production process.

The method further can comprise passing the cement clinker through a clinker cooler unit so as to cool the cement clinker. Such cooling can be carried out using a cooled portion of the gas stream including the carbon dioxide. This stream can be taken, for example, from a compressor unit or another point that is preferably downstream from any water separation.

The method further can comprise integrating the method for calcination with carbon capture into a steel-making process. In particular, the reactor may be configured to receive one or more streams from the steelmaking plant, such as a fuel gas stream (e.g., a coke oven gas stream, a blast furnace gas stream, and/or a basic oxygen furnace gas stream). Likewise, the method may be configured such that solids from the reactor (or the separator) may be delivered to one or more components in the steelmaking process (e.g., a blast furnace and/or a basic oxygen furnace). Further, an oxygen source may be shared between one or more components of the steelmaking process and the reactor in the present methods.

The method further can comprise injecting coal ash into the reactor and/or a separate reburner. Likewise, the method can comprise recovering thermally treated coal ash from the reactor and/or reburner. At least a portion of the thermally treated can be mixed with quicklime. Such treated ash may then be delivered for formation of other products, such as cement, concrete, fly ash bricks, aggregates, and the like. Similarly, the method can be configured to deliver a portion of the produced solids (e.g., quicklime) for mixing with high moisture ash to reduce the moisture level thereof and provide ash that is suitable for downstream uses, such as noted above. Likewise, a portion of the solids can be exported and optionally mixed with ash.

The heated reactor can be heated in particular with a fuel that comprises sour gas (i.e., natural gas or another gas stream that includes a sulfur species, such as $H_2S$, and optionally also carbon dioxide). The sour gas can mix with limestone in the reactor to form gypsum, which can be removed with the solids stream. As such, the sulfur species in the sour gas can be effectively removed.

DETAILED DESCRIPTION OF THE DISCLOSURE

Figure 1A:
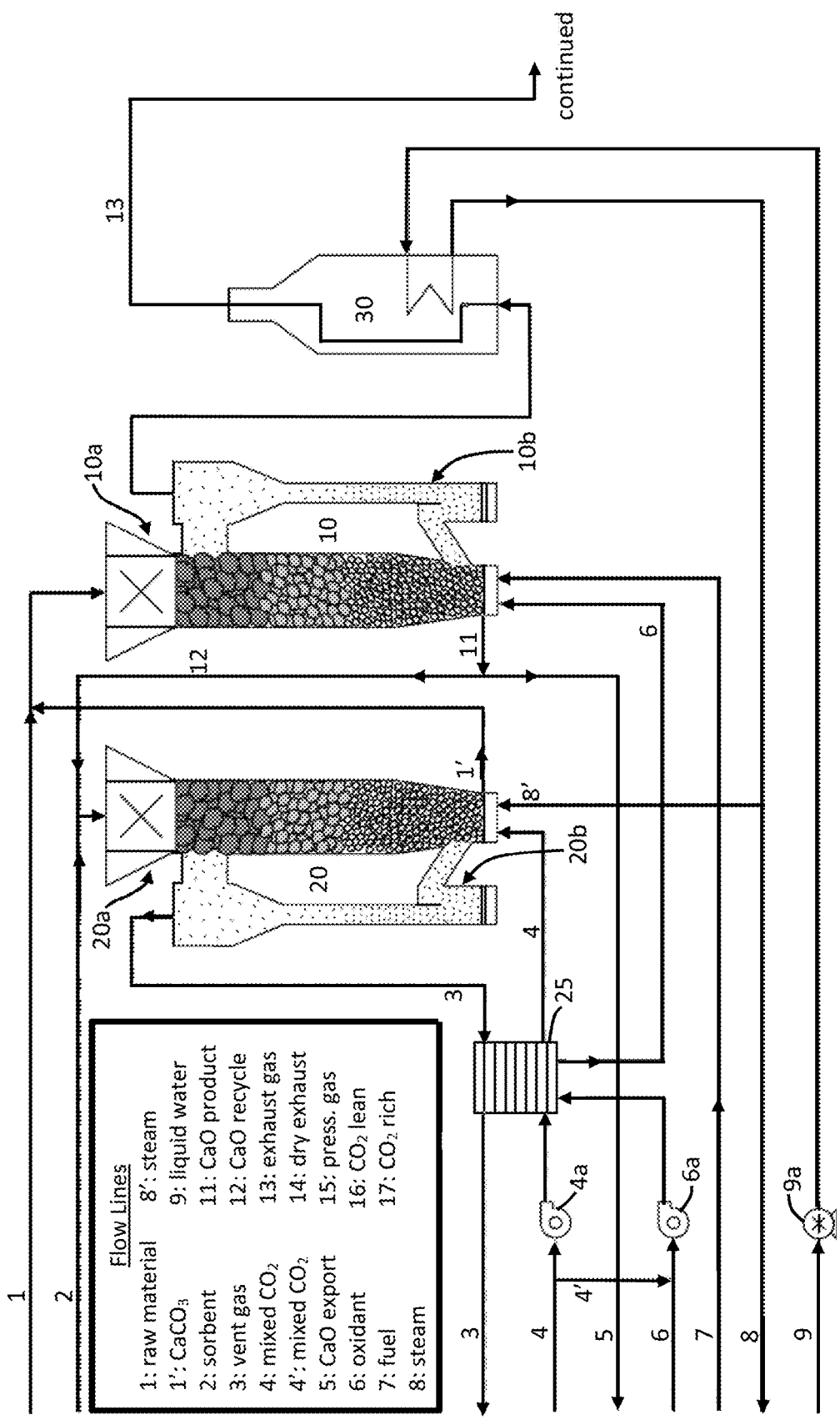
FIG. 1A and FIG. 1B provide an illustration of components of systems according to example embodiments of the present disclosure useful in the capture of carbon dioxide with simultaneous production of one or more industrially useful products.

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods for direct capture of at least one moiety (e.g., $CO_2$) from a provided stream. In particular, the systems and methods can be related to one or more industrial processes.

Limestone calcination is responsible for a portion (presently in excess of 7%) of the world's total greenhouse gas (GHG) emissions. The fuel consumed in converting calcium carbonate (limestone) into calcium oxide (quicklime) accounts for approximately 30%, and the off gas (i.e., carbon dioxide) that is liberated during calcination accounts for approximately 70% of this allocation. Nonetheless, calcination is a vital activity for industrialization seeing that it is a core process in cement manufacturing and generates a critical feedstock for a wide variety of industries. For example, lime is a critical commodity in the following markets: iron and steel (e.g., removing impurities and enhancing productivity); construction (e.g., making lightweight and highly insulating construction materials as well as aggregates, fillers, and bonding agents); civil engineering (e.g., improving stability and load bearing capacity of soil and improving asphalt durability); environmental protection (e.g., drinking water treatment to remove heavy metals, wastewater treatment to remove impurities, and flue gas purification); agriculture (e.g., nutrients for fertilizer, animal nutrition, and animal hygiene for preventing diseases); chemical industry (e.g., feedstock for forming calcium carbide and filler for paint, pharmaceuticals, and polyvinylchloride products); other industrial uses (e.g., removing impurities from sugar as well as glass and paper production); and export.

In one or more embodiments, the present disclosure relates to systems and methods whereby carbon dioxide (or other moieties) may be directly captured from an industrial process or from any process including calcination of a carbonate containing material, such as calcium carbonate (e.g., limestone). Systems suitable for carrying out the integration of carbon dioxide capture with one or more further processes may incorporate a variety of components that may be combined in any number to achieve the desired system configuration. Individual components or units useful for forming example embodiments of the systems are described in detail below, and it is understood that a person of skill reading the present disclosure will be able to recognize the useful and varied combinations that are encompassed herein in addition to any express embodiments that are further described below.

Reactor

In one or more embodiments, the present systems and method may incorporate the use of at least one reactor wherein a raw material may be heated in the presence of oxygen, and carbon dioxide (or another moiety) may be formed. Depending upon the specific mode of operation and the raw material that is utilized, the reactor may be more particularly referred to as a kiln or a calciner. In example embodiments, a reactor may be configured as a calciner for receiving a mineral component (e.g., limestone) and driving off carbon dioxide. Any of a number of configurations may be utilized in relation to the reactor. For example, the reactor may be configured as a vertical kiln, a horizontal kiln, an indirectly heated kiln, or in any other suitable configuration.

The reactor may be a stand-alone component or may be a segment or section of a reactor unit. In some embodiments, a reactor may be operated at a relatively low pressure but above ambient. For example, the operational pressure may be up to about 10 bar, up to about 8 bar, up to about 5 bar, or up to about 4 bar, such as in the range of about 1.5 bar to about 8 bar, about 2 bar to about 5 bar, or about 2 bar to about 3 bar. In particular, the operational pressure of a reactor may be any desired value that can reasonably be achieved with a conventional air blower design. The reactor preferably is oxygen enriched in that an oxygen source is provided to the reactor to ensure that desired chemical reactions proceed in the reactor environment. In some embodiments, the reactor can be operated as a pressure that is around 1 bar (e.g., +/−10%).

Pressurization of the reactor can be achieved by an incoming, blown oxidant and/or a gaseous, or vaporized, fuel source to be combusted or oxidized for heat production. The combusted or oxidized fuel source can provide beneficial heating to other components of the system, such as a calcination reactor. The fuel source may be any suitable material. In some embodiments, as noted above, a gaseous fuel may be utilized, and non-limiting examples include natural gas, synthesis gas, sour gas, BOS gas, digester gas, fuel oil, or the like. In some embodiments, a solid fuel may be used (e.g., particularized coal, biomass, lignite, or the like) and, in such embodiments, the oxidant may be the sole source of pressurization for the reactor. In such embodiments, it may be useful to operate the blower with increased discharge head to compensate for the lack of fuel contribution and create the desired internal reactor pressure. If desired, a liquid fuel may also be utilized. Fuel composition may vary as desired, and a mixture of fuel types may be used. In some embodiments as further described herein, it can be useful for the fuel to include at least a minimum carbon content. For example, the fuel entering the reactor may be at least 2%, at least 5%, at least 10%, or at least 15% molar carbon based on the total fuel content passing into the reactor (with a maximum carbon content being understood to be inherently limited by the chemical composition of the fuel).

Like the fuel, a variable chemistry may also be utilized in relation to the oxidant source. In some embodiments, substantially pure oxygen may be used (e.g., greater than 95%, greater than 98%, or greater than 99% molar oxygen); however, such purity levels are not required. In some embodiments, the oxidant may comprise a flue gas from an industrial process that may be operated in combination with or separately from the present system. Preferably, the oxidant stream entering the reactor is adapted to or configured to have a sufficient oxygen content to provide for substantially complete combustion of the input fuel (e.g., combustion of at least 95%, at least 98%, or at least 99% molar). Otherwise, air or oxygen from an air separation unit (ASU) or vacuum pressure swing absorption (VPSA) unit can be mixed with the flue gas to supplement this requirement or used as an unaltered input. The table below provides example embodiments of performance permutations for various oxidant sources. The cases include configurations where air, flue gas from a supercritical coal power plant, flue gas from a combined cycle power plant, and direct gas turbine exhaust gas serve as the oxidant sources. It should be noted that the oxidant source does not need to be free of acid gas compounds or particulates. As described herein, the acid gases and particulates can effectively be scrubbed out by the mineral product, solids separation, and/or water separation. This can be a large financial benefit for co-locating with a facility, such as a coal fired power plant.

| | OXIDANT SOURCE | | | |
|---|---|---|---|---|
| VARIABLE | GT FLUE GAS | CCGT FLUE GAS | SCPC FLUE GAS | AIR |
| fuel input (MW LHV) | 177 | 107 | 115 | 82 |
| $CO_2$ capture load (MW) | 10.52 | 16.78 | 18.75 | 8.25 |
| $CO_2$ export load (MW) | 6.33 | 5.33 | 6.45 | 3.96 |
| net power produced (MW) | −31.5 | −0.45 | −0.23 | 0.2 |
| lime produced (tonne/yr) | 684,265 | 491,186 | 491,186 | 491,186 |
| $CO_2$ produced (tonne/yr) | 675,850 | 569,205 | 687,618 | 421,699 |

The reactor may be fired at a temperature that preferably is suitable for carbonate mineral decomposition. For example, firing temperature may be about 850° C. or greater, about 900° C. or greater, about 950° C. or greater, or about 1000° C. or greater (e.g., up to the practical limits of the equipment utilized), such as in a range of about 850° C. to about 1100° C., about 900° C. to about 1100° C., or about 950° C. to about 1100° C.

The reactor may be operated sequentially with a solids separation component which may be integral with the reactor (e.g., positioned at an outlet of the reactor) or may be a component of a reactor unit, or may be a stand-alone component of the overall system. Any suitable separation equipment may be utilized, such as a cyclone separator, a candle filter, and/or any other combination of these technologies and others. The performance of the solids separator should be sufficient that the exiting gas is appropriate for use with a heat recovery device. In some embodiments, exiting gas may undergo further cleansing such that it can be directly fed to the inlet of a high speed turbomachinery.

In some embodiments, the reactor and any optional, associated components may be adapted to or configured to provide a gas exit stream (i.e., a flue gas) that is substantially free of any solid particles (e.g., no more than 0.01% by weight of particulates based on the overall mass of the exiting gaseous stream) or that is completely free of any solid particles. Moreover, such exiting gas stream may be configured to be at a specified temperature, such as no greater than about 700° C. Such temperature limitation for the exiting gas stream may be advantageous to allow for downstream heat recuperation via commercially available equipment that preferably can utilize non-nickel based alloys. In order to achieve the limitation of about 700° C. in coordination with a reactor temperature in a higher range as noted above, it can be useful to exchange a portion of the heat with one or more further streams, which may include one or more of the reactor input streams. For example, in a vertical kiln, a carbonate mineral feedstock can be provided counter currently to the combustion flue gas stream exiting the kiln. The rate of mineral introduction into the kiln can be controlled in such a manner that the temperature of the carbonate-containing stream entering the kiln can be heated from ambient to a defined value that can substantially correspond to a temperature approaching the temperature of the gaseous stream exiting the kiln, such as in the range of approximately 650° C. to near 700° C. A comparable mode of operation may also be implemented in a bottom portion of the kiln in relation to an incoming oxidant and/or fuel stream. In particular, incoming oxidant and/or fuel may be heated up against the exiting decarbonized product. This will have the added effect of improving fuel efficiency.

The scale of the reactor can be sized in some embodiments such that it is compatible for use primarily as part of a power generation system. For example, a gas turbine can directly introduce its exhaust into the reactor to provide heat. The burner in the reactor may operate at a level that is just sufficient to create enough mineral product for scrubbing of the gas turbine exhaust gas impurities. Otherwise, burning more fuel may effectively function as "duct" firing for downstream power generation at a steam turbine. Scaling the reactor accordingly can be of substantially no effect on downstream system components, such as those described below in relation to dewatering through $CO_2$ export. This effectively may be a combined cycle with integrated carbon capture, particulate removal in the form of cyclone filtration and venturi scrubbing instead of electrostatic precipitation or bag filters, and NOx removal in the form of dry scrubbing instead of SCR. Should the gas turbine be removed and coal used as the fuel source, the present system may effectively function as a coal power station with all of the above advantages but also flue gas desulfurization (FGD) via the reactor.

In some embodiments, a carbonator can be attached to the reactor to increase the flue gas $CO_2$ capture rate. Calcium oxide ("quicklime" or CaO) produced from the reactor can be at a temperature of about 900° C. to about 1,000° C. A portion of the CaO exiting the reactor may be cooled to reduce the temperature to a lower range, such as about 600° C., then it can be fed to a carbonator to remove $CO_2$ from industrial flue gas via a carbonation reaction (CaO+$CO_2$=$CaCO_3$). The operating temperature of the carbonator thus can be in a range of about 600° C. to about 650° C. The $CaCO_3$ exiting the carbonator can be recycled back to the reactor for calcination. The CaO that is not cooled and fed to the carbonator can be exported. The ratio of the export CaO to the CaO entering the carbonator is preferably in the range of about 5:1 to about 0.5:1, such as about 4:1 to about 1:1 or about 4:1 to about 2:1 or about 3:1 to about 1:1. Utilizing such ratio can be critical to ensure that the calcium looking does not result in deactivation of the calcium oxide for carbon dioxide capture. The industrial flue gas can be preheated to a temperature in the range of about 400° C. to about 500° C. against a hot stream in the system before entering the carbonator, and this can be useful to maintain a preferred operating temperature of the carbonator. The $CO_2$ lean flue gas from the carbonator can be cooled to close to the ambient temperature before being vented. The recuperated heat can be used to steam power generation.

In some embodiment, equipment for existing plants may be utilized instead of requiring the provision of a new reactor. For example, the kiln in a cement plant or a quicklime plant can be retrofitted for operation according to the present disclosure in order to capture $CO_2$ from the cement and/or quicklime plant.

In some embodiment, high carbon/moisture content coal ash can be co-injected into the reactor to reduce the carbon/ moisture content. Carbon in the coal ash can provide heating value to the fuel consumption for the reactor operation. The thermal treated coal ash blended with CaO can be used for making cement, concrete, and other building materials. In some embodiment, the coal ash re-burner can be a stand-alone unit placed at the exit of the reactor. The reactor flue gas, fuel, and oxidant can be injected into the coal ash re-burner to burn off the carbon in the coal ash. The thermal treated coal ash can be exported without being blended with CaO.

Heat Recuperator

In one or more embodiments, systems as described herein can incorporate one or more heat recuperator components and/or heat recuperator units. For example, a single heat recuperator (e.g., a recuperative heat exchanger, a heat recovery steam generator (HRSG), a gas heated reformer (GHR), or the like) may be utilized independently. Alternatively, or additionally, a plurality of heat recuperators (e.g., a plurality of any of the aforementioned example embodiments and the like and/or a combination of different types of the aforementioned heat recuperators) may be utilized. Accordingly, the substantially or completely solids-free gas stream (or flue gas) exiting the reactor or reactor unit can be subjected to at least one heat recuperation step. As such, the heat recuperator(s) may be adapted to or configured to transfer as much of the remaining heat as possible to a heat transfer working fluid and/or provide the thermal input for an additional chemical process. In some example embodiments, a HRSG may be used in conjunction with the flue gas to power a three pressure reheat steam turbine arrangement for power generation. Alternatively, or additionally, the flue gas may be used to heat a GHR for $H_2$ generation from natural gas. In this last scenario, it may be necessary to integrate a duct burner into the flue gas stream to facilitate the production of temperatures in excess of 700° C. Ideally, heat for a GHR may be in the range of approximately 1,000° C. The heat recuperator(s) preferably can be adapted to or configured to transfer a sufficient quantity of heat to meet the noted uses (or other uses) while providing the gas stream at a significantly reduced temperature. In some embodiments, it can be useful for the gas stream exiting the heat recuperator(s) to be at a temperature that is substantially close to ambient. For example, the temperature of the stream exiting the heat recuperator(s) or heat recuperator unit may be in a range of about 20° C. to about 150° C., about 20° C. to about 100° C., or about 30° C. to about 80° C.

Drier/Water Separator

In one or more embodiments, systems as described herein can incorporate one or more driers or drying unit which may incorporate components adapted to or configured to remove water or moisture in general from the gas stream. In some embodiments, drying/water separation can be carried out utilizing a single unit adapted to or configured to perform a plurality of drying steps or may be carried out utilizing a plurality of individual drying components adapted to or configured to perform different types of drying actions. A first drying component can be any element adapted to or configured to remove any remaining heat in the stream in excess of about ambient temperature. This can include providing for sensible heat rejection to bring the flue gas to about ambient temperature (e.g., +/−10° C. or +/−5° C.). In an example embodiment, a wet venturi scrubber may be used as the first drying component. In addition to providing cooling, a venturi scrubber can be useful to assist in dissolving acid gas chemistry into a liquid phase and removing any fine solids still entrained in the flue gas. A suitable cooling medium for such scrubber can include condensed process water that may be temperature controlled via a dry cooling tower arrangement.

A second drying component can include one or more desiccation components. Such may provide for a desiccation phase where water vapor can be removed such that the dew point of any remaining water near or below the liquefaction temperature for carbon dioxide, such as in the range of about −40° C. or below, about −50° C. or below, or about −55° C. or below. In an example embodiment, a suitable desiccation component may include a bed of activated alumina or similar desiccant. A desiccant unit may particularly be used in the $CO_2$ purification unit as further described below. As such, water separation may take place in multiple steps that can be separated by other components/steps of the system and method.

Pressurization

In one or more embodiments, systems as described herein can incorporate one or more pressurization components or a pressurization unit. These may include any type of compression device or compression unit (e.g., a single stage compressor or a multi-stage compressor that may or may not be intercooled between one or more of the compression stages, including, if desired, after the final compression stage) and/or a pump. Any pressurization component may be preferably adapted to or configured to provide a discharge pressure that can be in the range of about 3 bar to about 15 bar, about 4 bar to about 12 bar, or about 5 bar to about 10 bar. The pressurization component(s) or pressurization unit may include a post-compression heat exchanger that can be adapted to or configured to remove at least a portion of any remaining heat of compression such that the flue gas may be cooled once again to near ambient temperature. Pressurization may be optional; however, pressurization can be particularly useful for facilitating $CO_2$ removal as pressurization can be beneficial upstream of any membrane separation stage and can also allow for refrigeration through downstream expansion of the compressed stream.

Acid Gas Separator

In one or more embodiments, systems as described herein can incorporate one or more acid gas separation components. For example, in some embodiments, a $CO_2$ separation membrane component or unit may be utilized. In further embodiments, a water scrubber can be provided upstream from the membrane separation component or unit. Since the flue gas leaving the pressurization component(s) or unit preferably can be in a pressure range as noted above, any residual SOx and NOx in the flue gas will be oxidized to terminal acid species via the oxygen in the flue gas. The acid gas separator, such as a separation membrane, can be adapted to or configured to provide at least 50% bulk recovery of the input $CO_2$ as part of the permeate product with a $CO_2$ concentration no lower than 50%.

As mentioned above, the fuel input to the reactor can either be gaseous, solid, or liquid. The chemistry of the fuel can be vary as desired since a bulk of the $CO_2$ generated in the system can be derived from the carbonate mineral that is input into the reactor along with the fuel and oxidant. In order for any $CO_2$ membrane used herein to be of reasonable scale, performance, and cost, it can be desirable in some embodiments for the system to be adapted or configured to provide for a flue gas $CO_2$ concentration (i.e., immediately downstream from the reactor) to be such that the flue gas has a $CO_2$ concentration or about 30% or greater by weight, about 35% or greater by weight, or about 40% or greater by weight. In some embodiments, $CO_2$ concentration in the flue gas exiting the kiln can be about 30% to about 90%, about 35% to about 75%, or about 40% to about 60% by weight based on the total weight of the flue gas stream. As this value goes down, the inlet pressure to the membrane separator used in the acid gas removal component or unit must increase, and the permeate purity begins to degrade. Therefore, while the fuel chemistry can vary, in some embodiments, it can be beneficial for the fuel to include at least a minimum carbon content as already noted above. If the carbon content is below the desired range, nitrogen and sulfur contaminants can be of minimal to moderate economic concern but not technical concern. NOx and SOx species that are formed will bond to the partially oxidized mineral product. For example, in embodiments where quicklime (CaO) is formed from limestone in the reactor, NOx and SOx will combine with the CaO to create calcium sulfate (gypsum) and calcium nitrate (Norwegian saltpeter). In fact, the formation of these compounds may be encouraged by the addition of steam to the kiln in some embodiments. Furthermore, any NOx or SOx that does make its way to the high pressure water scrubbing step will be dissolved as liquid phase acid. The economic impact thus may only arise in embodiments wherein it is desirable to form and sale these compounds. In such embodiments, the present systems therefore can include any components necessary to effect separation of such materials from the primary product. The ability to provide for removal of NOx and SOx utilizing such scrubbing technology can be beneficial to allow for the use of relatively lower quality fuels such as heating fuel oil (HFO) (e.g., diesel #9, "bunker" fuel) and high sulfur petcoke.

Carbon Dioxide Purifier

In one or more embodiments, systems as described herein can incorporate one or more carbon dioxide purification component or unit. In example embodiments, the purifier can include a low temperature purifier, which optionally may include a cryogenic purifier. The purifier(s) can be beneficial such that the $CO_2$ product is further refined to a higher concentration via the off-gassing of $N_2$ and $O_2$ content. The final refrigeration requirement of this step will be determined by the desired $CO_2$ purity for end use. Nonetheless, the retentate from the membrane separation can be expanded from a pressure as defined above to near ambient pressure, such as by utilizing a turbo-expander. The shaft power generated then may be used to help offset the energy used in upstream compression. In some embodiments, the carbon dioxide purifier and the pressurization component(s) may be linked. For example, the turbo-expander and compressor may be configured as a "compander" type system, such as is commonly used for industrial gas production in air separation units. The low-pressure retentate exiting the turbo-expander can be at a temperature of preferably about −40° C. or below, about −50° C. or below, or about −55° C. or below. This gas may be used, for example, as supplemental refrigeration for the cryogenic purification.

The carbon dioxide purifier can be adapted to or configured to provide a $CO_2$ product in a condition such that the stream is about 90% or greater, about 95% or greater, about 98% or greater, or about 99% or greater $CO_2$ based on the total weight of the stream. At this value, it may not be necessary for the cryogenic purifier to use a distillation column. Condensation of $CO_2$ into the liquid phase can be sufficient. If a higher purity is desired (e.g., above a concentration of about 95%) it may be beneficial to include a column as previously noted. As well, a distillation column with off gas recycle may also assist in higher $CO_2$ recovery rates. As a final matter, regardless of the $CO_2$ concentration that is desired, the present systems can include any suitable equipment such that the liquid carbon dioxide product may be pumped to a desired pressure and sent to export.

In one or more embodiments, a low temperature $CO_2$ purification unit can specifically comprise one or more compressors (e.g., a compression unit as otherwise described above), one or more heat exchangers, and one or more separators. In particular, the $CO_2$ purification unit can include at least one membrane separation stage that is effective to provide at least 50% bulk recovery of the input $CO_2$ in a $CO_2$ rich stream with a $CO_2$ concentration no lower than 50%. In some embodiments, a desiccant drier bed can be provided downstream of the compression steps to provide further drying of the gas stream. The methods of operation can include passing at least one cold product stream through at least one heat exchanger to recover its cold energy for cooling the compressed and dried gas stream. For example, the supplementary cold energy for cooling the compressed and dried $CO_2$ stream can be provided by evaporating a portion of a liquid $CO_2$ product stream. In other embodiments, supplementary cooling can be provided by an external refrigeration loop.

Example Systems and Methods of Operation

Figure 1B:
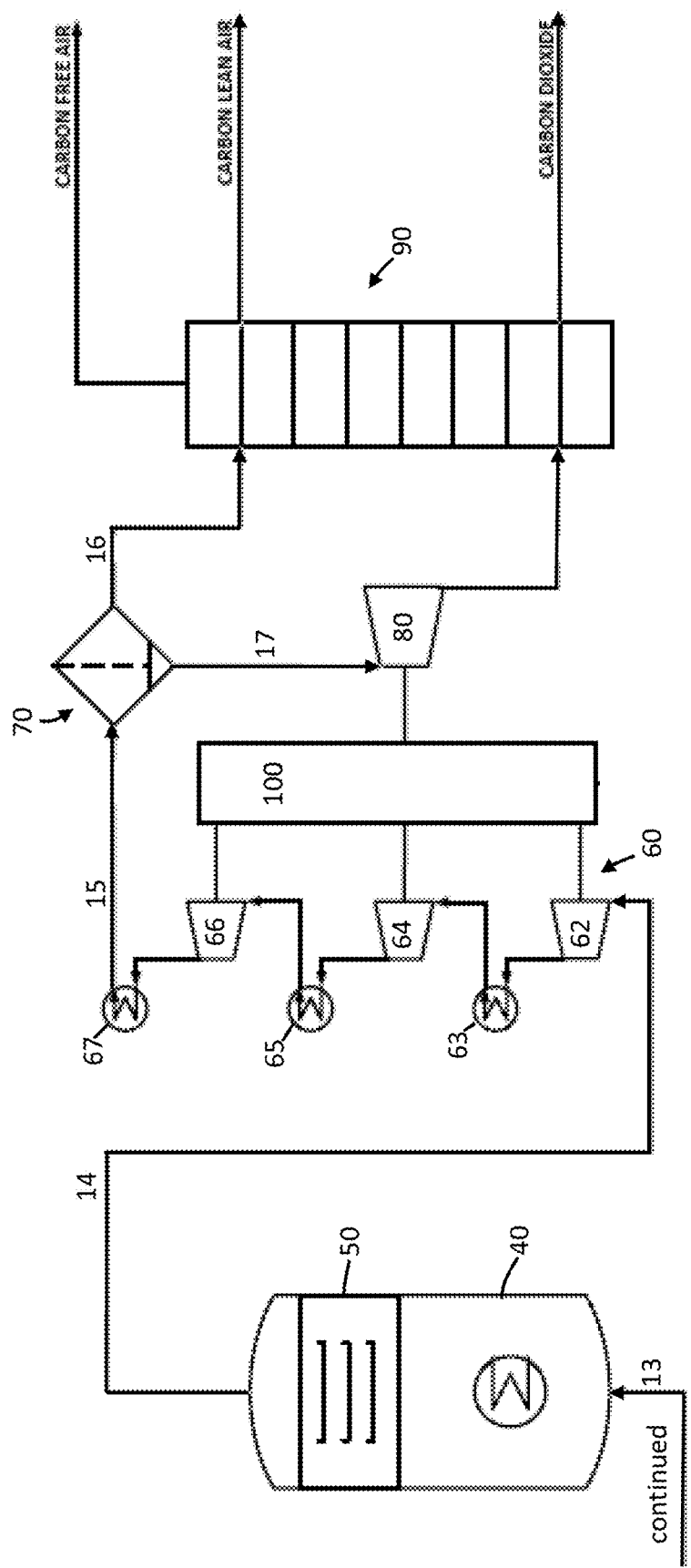

Example embodiments of a system useful according to the present disclosure, including for carrying out any of the example embodiments of methods of operation further described herein may be as substantially shown in FIG. 1A and FIG. 1B. As seen therein, line 1 can be adapted to or configured to provide a mineral or other raw material into the reactor 10 (which may particularly be referenced as a calciner or calcination reactor in the example embodiment). In example embodiments, the mineral can be limestone, and line 1 can be adapted to or configured to deliver a feed stream and/or makeup stream of the limestone (or other mineral depending upon the particular process employed) to the reactor 10 for formation of quicklime (CaO). The CaO may exit the reactor 10 through line 11. As least a portion of the CaO in line 11 may exit the system for export through line 5. In some embodiments, at least a portion of the CaO in line 11 may be passed through line 12 to the carbonator 20 for carbonation to re-form calcium carbonate to be sent back to the calciner in line 1'. During normal operation, limestone can be brought in as makeup from an external mine/source. In embodiments wherein the system may be operating with an optional carbonator 20 in parallel to the reactor 10, calcium carbonate product from the carbonator may also be feed to the calcination reactor through line 1'. It should be noted that in both scenarios, the input of new makeup brought in from an external mine/source may remain substantially unchanged since the export flow rate of quicklime leaving the plant/system preferably also is substantially unchanged. As illustrated in FIG. 1A, the reactor 10 is configured as a unit including a reactor section 10a and a cyclone solids separator section 10b.

As noted above, the carbonator 20 may be optionally present and thus may be excluded. Accordingly, any lines described as entering or exiting the carbonator 20 may likewise be optional and may be excluded. In some embodiments, a carbonator unit 20 may be expressly utilized in the present systems. As seen in FIG. 1A, line 2 can be adapted to or configured to provide a stream of a sorbent that can optionally be used to bond to $CO_2$ content in a mixed $CO_2$ gas stream (e.g., a flue gas) that can be provided to the carbonator through line 4. For example, the sorbent in line 2 may be a mineral, such as olivine that, in the presence of heat and/or steam, can bond to the $CO_2$ and generate a solid exportable product. In such embodiments, quicklime generated in the reactor 10 may proceed substantially completely through line 5 as a product for export and will not be partially diverted to the carbonator 20 through line 12. Likewise, product from the carbonator 20 in such embodiments would not be fed to the reactor 10 through line 1'. Vent gas from the carbonator 20 may be passed therefrom through line 3, and the vent gas stream preferably can be substantially free of $CO_2$. In some embodiments, the carbonator 20 can be operated at a temperature of about 600° C. to about 650° C., and the vent gas in line 3 can undergo heat recovery prior to being released into the atmosphere by passing the vent gas in line 3 through an optional heat exchanger 25, which may provide heat to one or more further streams as described herein.

As otherwise noted herein, a flue gas stream may be utilized in one or more embodiments of the present disclosure, and such flue gas may be provided as the mixed $CO_2$ stream through line 4. The flue gas may comprise predominately or at least in part carbon dioxide and may originate from a power plant or some other emissions source that can be used in a variety of different ways. In some embodiments, the flue gas in line 4 may be utilized as at least a portion of the oxidant source for achieving combustion of the fuel in the calcination kiln 10. This is seen in line 4', which may supplement or replace the oxidant in line 6. If the flue gas does not include a sufficient oxygen content, it may be supplemented with additional $O_2$ in line 6. The oxidant provided in line 6 may be any suitable oxygen source as otherwise described herein, such as substantially pure oxygen and/or air. In embodiments wherein the carbonator 20 is utilized, the flue gas in line 4 can still be used as an oxygen source for the calcination reactor 10 or not at all. If the flue gas is not used in such manner, then all of the oxygen must come from the oxidant line 6. Otherwise, all or a portion of the flue gas may be fed to the carbonator 20 to be scrubbed of $CO_2$ and then vented. All or a portion of the flue gas in line 4 may be heated in the heat exchanger 25 against the vent gas in line 3. A blower 4a and/or a blower 6a may be utilized for pressurizing the flue gas in line 4 and/or the oxidant in line 6, respectively. One of the blowers may be optionally present; however, it is understood that at least one of the blowers is present in the noted line to provide for the necessary pressurization. Fuel can be passed to the reactor via line 7 and may include any material as already described herein.

Water and steam may be passed through line 9 and line 8, respectively, in embodiments wherein an HRSG is utilized as the heat recuperator 30. As illustrated in the embodiment of FIG. 1A, the feedwater in line 9 can pass through a pump 9a to be circulated through the heat recuperator 30 where it is heated to form steam, which may be withdrawn for use in other processes, for power production, and the like. Optionally, a portion of the steam in line 8 may be directed through line 8' to the carbonator 20.

Exhaust gas that has been cooled in the heat recuperator 30 can pass through line 13 for further processing, as shown in FIG. 1B. As illustrated, the exhaust gas in line 13 passes sequentially through a water separator 40 and a desiccant drier 50 to provide a substantially dry (e.g., less than 0.5% water) exhaust gas in line 14. The dry exhaust then proceeds to pressurization unit 60 where it passes through a series of compression states (62, 64, 66) and associated after-coolers (63, 65, 67) to provide the pressurized exhaust in line 15. The pressurized gas is processed through a membrane separator 70 to provide a lean $CO_2$ stream in line 16 and a rich $CO_2$ stream in line 17. The rich $CO_2$ stream can be processed through a turbo-expander 80 which, as illustrated, can be linked to the compressor unit 60 through a compander 100, and the expanded, rich $CO_2$ stream can then be passed through a low temperature $CO_2$ separator 90 along with the lean $CO_2$ stream in line 16. The low temperature $CO_2$ separator 90 thus can provide substantially carbon free air (e.g., less than 0.1% carbon by weight), carbon lean air, and a carbon dioxide stream, which can be subjected to carbon capture utilization and sequestration (CCUS), such as providing for EOR or other uses. Although the compander 100, membrane 70, and turbo-expander 80 are shown, it is understood that one or more of these components may be excluded in some embodiments.

In FIG. 1B, one or more of the components illustrated therein may be re-arranged as desired to effect the $CO_2$ purification that is desired. For example, the desiccant drier 50 may be alternatively positioned downstream of the compression stages (62, 64, 66). Likewise, one or more of the compression stages (62, 64, 66), the compander 100, the expander 80, the membrane separator 70, and the low temperature $CO_2$ separator 90 may be combined to form a $CO_2$ purification unit. In other words, a $CO_2$ purification unit as utilized herein may include at least a low temperature $CO_2$ separator 90 and at least one membrane separation stage 70. In other embodiments, a $CO_2$ purification unit as utilized herein may include at least a low temperature $CO_2$ separator 90, at least one membrane separation stage 70, and at least one or more compressors (e.g., 62, 64, 66). In some embodiments, the $CO_2$ purification unit include a desiccant drier (e.g., unit 50), which may be positioned between one or more compressors and at least one membrane separation stage 70.

Operational Embodiments of the System

System components as described herein may be combined in a variety of manners for implementation various operational embodiments of the present disclosure. Provided below are multiple example embodiments of methods whereby the system components may be utilized for carbon capture in combination with production of other, industrially useful products, and/or power production. In various embodiments described herein, the systems may be utilized at least in part for lime production, cement production, steel making, and similar industrial processes.

In one or more embodiments, the system may be operated predominately, substantially, or completely in an oxy-fired process. In such embodiments, waste heat from the reactor 10 may be used for power generation to reduce the power consumption of carbon capture and purification from the calcination process. The described process can be integrated with post-combustion $CO_2$ capture from the flue gas from existing power plants and lime/cement/steel making plants, or integrated with a caustic liquid scrubbing system for direct air capture by adding a carbonation reactor in the process. Oxygen rich calcination process can be either partial oxy-fuel combustion or full oxy-fuel combustion. Oxygen generation in various embodiments may be from an air separation unit, a membrane based generation process, pressure swing absorber (PSA), vacuum pressure swing absorber (VPSA), bio-reactor, and/or other processes.

Figure 2:
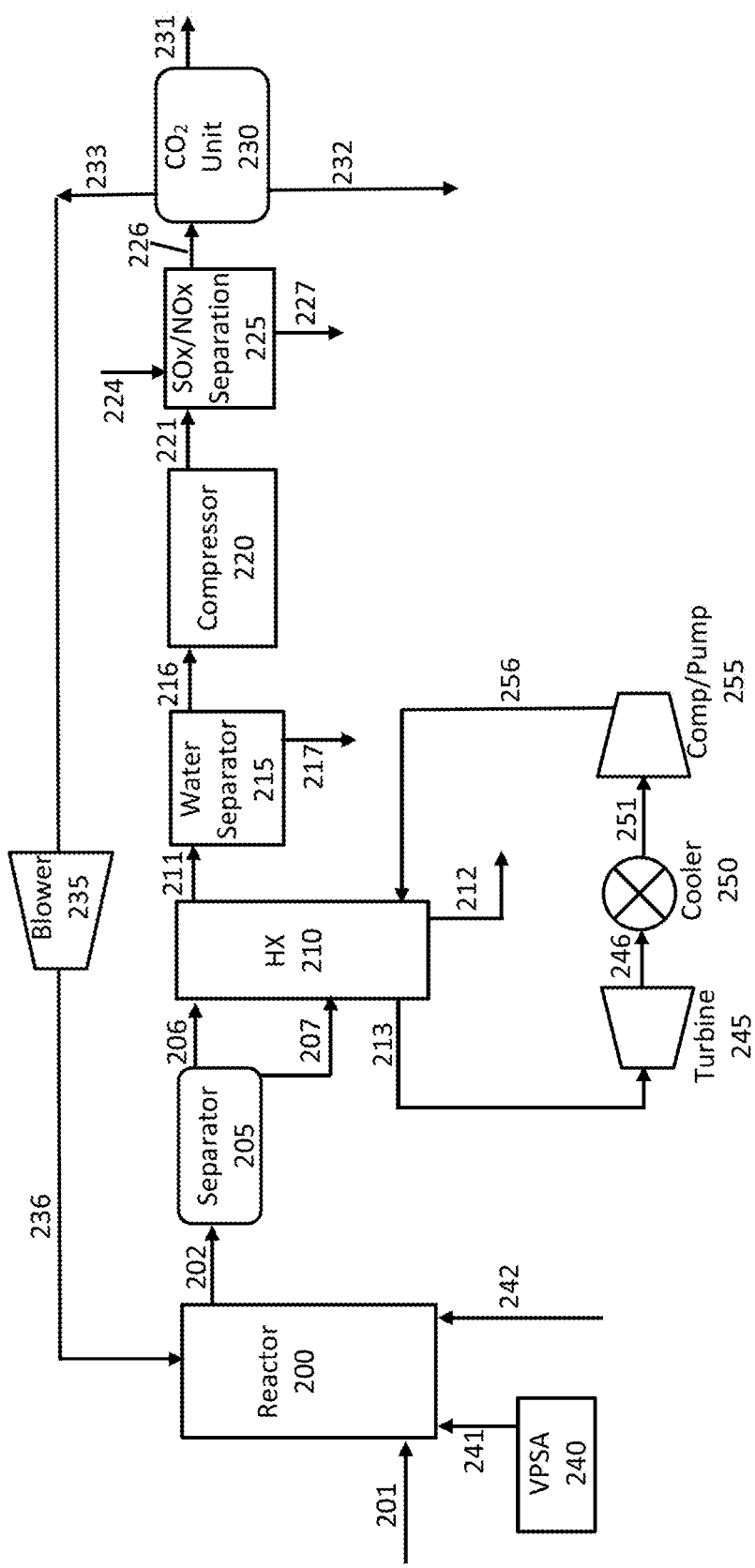
FIG. 2 is a flowchart illustrating a process according to an example embodiment of the present disclosure whereby limestone can be processed to make quicklime with power production and carbon dioxide capture.

An example embodiment of such operation of the presently disclosed systems is illustrated in FIG. 2, wherein reactor 200 can be configured for operation with carbon capture. As seen in FIG. 2, limestone can be injected in line 201 into a reactor 200 together with oxygen in line 241 from a VPSA unit 240, fuel in line 242, and recycled $CO_2$ gas in line 236 for calcination reaction. All the input gas and solid streams can be preheated by the flue gas and hot solids (CaO) from the reactor 200 in the heat exchanger network 210 before being injected into the reactor to improve the heat utilization. Solid product, which can be, for example, quicklime (CaO), can be separated from flue gas in a solid gas separator 205 (e.g., a cyclone separator). The CaO in line 207 and the flue gas in line 206 pass through the heat exchanger 210 such that cooled flue gas exits in line 211 and CaO for export exits in line 212. The reactor 200 in such embodiments preferably may be operated at a temperature of about 900° C. to about 1000° C. and a pressure that is above ambient pressure. The heat exchanger network can be, for example, at least one gas-to-gas heat exchanger and gas-to-solid exchanger. Reactor 200 inlet streams can be preheated in the heat exchanger network 210. Additional waste heat from reactor exhaust streams can be used to drive a closed loop power cycle to produce $CO_2$ free electricity to reduce or fully cover the calciner plant power consumption. Steam, supercritical $CO_2$, and/or other working fluid can be used for the power cycle. The waste heat being used for preheating calciner inlets and the waste heat used for driving the closed loop power cycle can be adjusted to obtain a lowest operational cost (fuel cost vs. electricity cost). Another option is using most of the waste heat for power generation to produce excess power as by-product. As illustrated in FIG. 2, a compressed working stream in line 256 is passed through the heat exchanger 210 and exits as heated stream 213, which is expanded in turbine 245. The expanded stream in line 246 is cooled in cooler 250 and exits in line 251 to be compressed again in a compressor and/or pump unit 255 to regenerate the working fluid for re-heating in the heat exchanger.

Low temperature quicklime in line 212 exiting the heat exchanger network can be exported directly for sale, or mixed with water to produce hydrated lime, or sent for clinker formation at a cement plant. Flue gas in line 211 exiting the heat exchanger network typically can be near ambient temperature with liquid water removed from the gas in separator 215 (water exiting in line 217) before compression. The dry gas in line 216 can be compressed in the compressor unit 220 to a relatively high pressure (e.g., about 10 bar or greater) and sent in line 221 to a water scrubber 225. In the water scrubber 225, NO and residual $SO_2$ generated from the calciner can be quickly oxidized by the excess oxygen in the flue gas into $NO_2$ and $SO_3$ under high pressure environment, then react with water to form $H_2SO_4$ and $HNO_3$ being dissolved in the liquid water and removed in line 227 from the $CO_2$ stream, which exits in line 226. Water can be input to the separator 225 through line 224. Some strong oxidants, such as $H_2O_2$ and $O_3$, can be optionally injected into the water scrubber to facilitate $SO_2$/NO oxidation. Cleaned $CO_2$ stream in line 226 from the water scrubber can be sent to a cryogenic type $CO_2$ purification unit 230 to generate over 99% purity $CO_2$ in line 232 for use in, for example, EOR and other industrial chemical processes. A portion of clean $CO_2$ can be recycled back to the reactor through line 233 for combustion temperature control. The clean $CO_2$ in line 233 can be compressed in blower 235 before passing in line 236 to the reactor 200. Gas that is substantially free of $CO_2$ may be vented from the $CO_2$ purification unit 230 in line 231.

Figure 3:
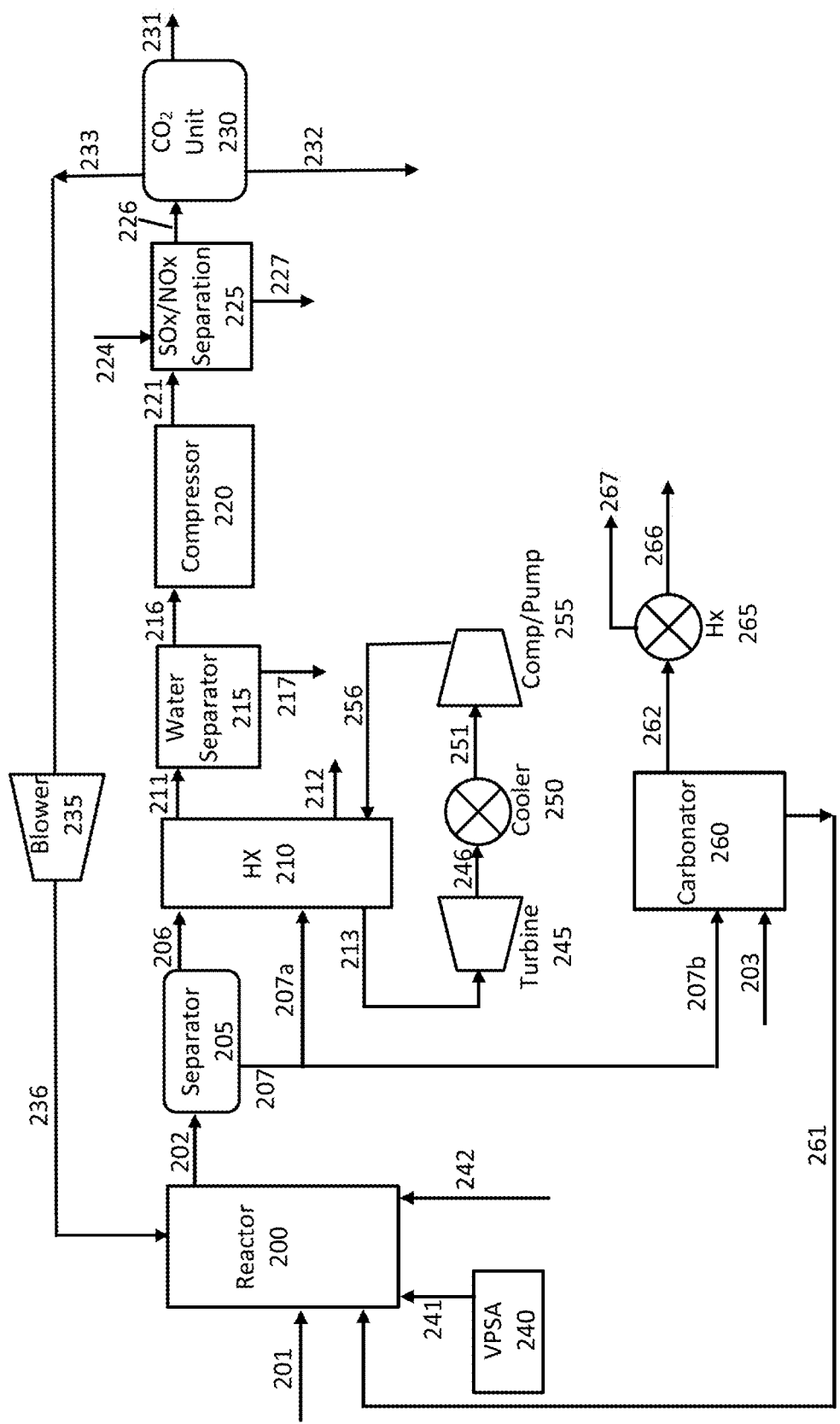
FIG. 3 is a flowchart illustrating a process according to an example embodiment of the present disclosure whereby limestone can be processed to make quicklime with power production and carbon dioxide capture while simultaneously processing an industrial flue gas for carbonation of a portion of the quicklime.

In another example embodiment, as illustrated in FIG. 3, oxy-calcination can be integrated with post-combustion carbon capture. In such embodiments, the reactor system 200 can be operated with an adjacent carbonation reactor 260. Heat from the outlet of the reactor 200 may be used to operate a carbonation reactor 260 that, for example, scrubs $CO_2$ from a flue gas. Given that carbonation is typically an exothermic reaction, the heat of the reactor may be recovered and reintegrated into the core reactor operation. This method of moving heat back and forth can beneficially provide for exploitation of the heat of formation but at an elevated temperature.

As seen in the example embodiment of FIG. 3, oxy-fired calcination process can be integrated with a post combustion industrial carbon capture process ($CaO+CO_2=CaCO_3$). At the exit of the separator 205, CaO at about 900° C. in line 207 can be split into two streams. One CaO stream in line 207a can be sent to the heat exchanger network for waste heat recuperation before export. The other CaO stream in line 207b can be sent to a carbonator to capture $CO_2$ from industrial flue gas provided through line 203 in a carbonator operated at about 650° C. The industrial flue gas can be taken from an existing power plant, lime production plant, cement plant, steel plant and/or other industrial process. At the exit of the carbonator 260, $CaCO_3$ can be separated (in line 261) from flue gas (in line 262) and directly sent back to the calciner reactor 200 for CaO regeneration. $CO_2$ lean flue gas from the carbonator 260 in line 262 at around 650° C. can be cooled in a heat exchanger 265 down to near ambient temperature before venting in line 266. The high grade heat (see element 267 in FIG. 3) can be used for preheating the inlet streams of the calciner reactor 200 or carbonator 260 or for power generation. The remaining components in FIG. 3 may be configured for operation substantially as described in relation to FIG. 2.

Although calcium looping technology for carbon capture has been previously described, it is well known for suffering from an inherent failure in relation to quicklime sorbent deactivation. In particular, the active fraction of the quicklime sorbent is known to reduce significantly based on the number of cycles through the calcium looping process. Whereas sorbent activity may begin in the range of about 0.7 to about 0.8, this quickly decreases to under 0.4 in as few as five cycles, to under 0.2 in between 10 and 15 cycles, and begins approaching only 0.1 in approximately 25 to 30 cycles. This issue is resolved according to the presently disclosed systems and methods by integrating calcium looping carbon capture with the proposed lime production process. This solution is achieved because the CaO makeup rate for calcium looping is increased significantly. In addition, a significant portion of the combustion heat used for endothermic calcination reaction is released in the carbonator (i.e., via the exothermic carbonation reaction) at about 650° C. and recuperated in the heat exchanger for inlet stream preheating or power generation. Thusly, the overall cycle efficiency is improved significantly.

Figure 4:
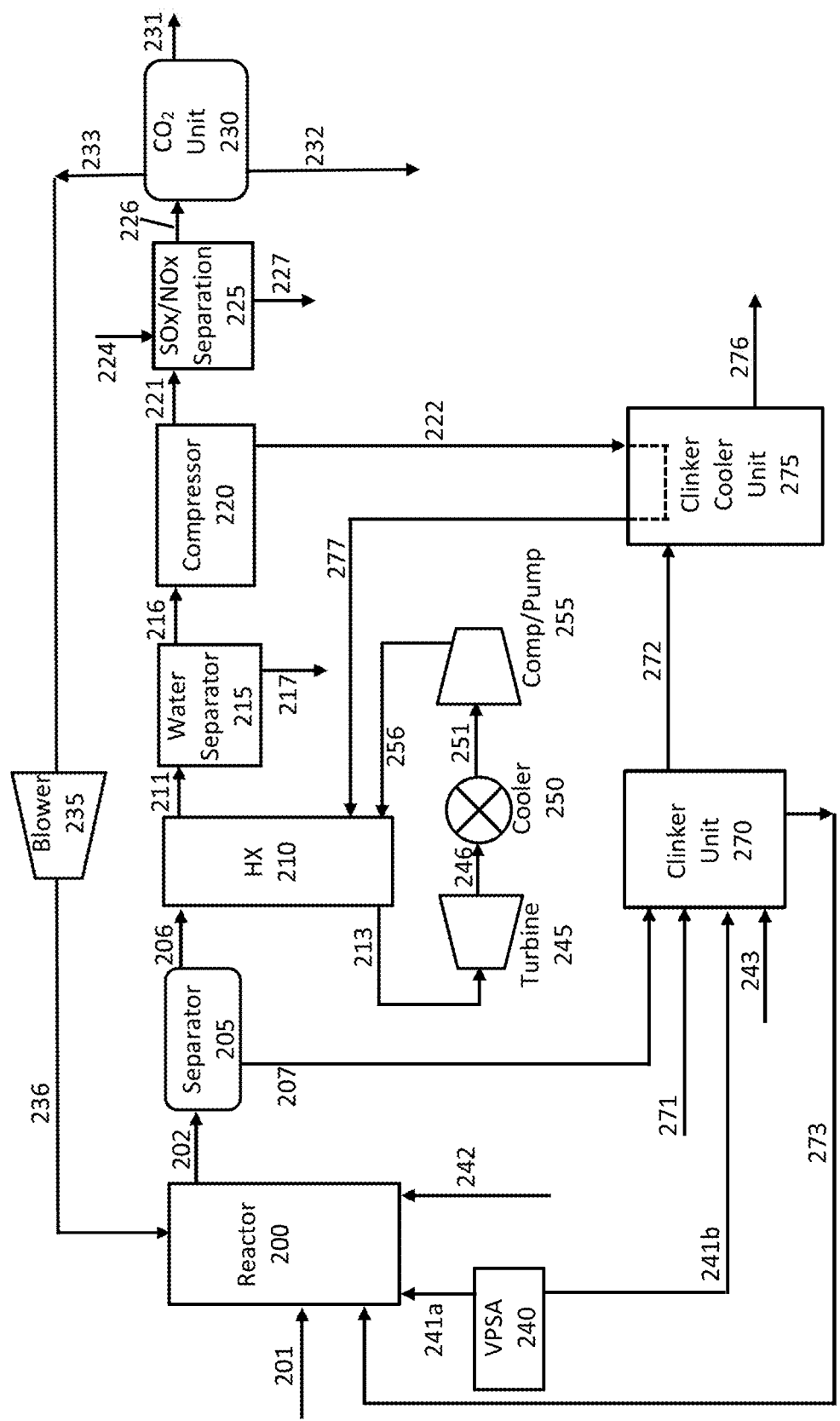
FIG. 4 is a flowchart illustrating a process according to an example embodiment of the present disclosure whereby limestone can be processed to make quicklime with power production and carbon dioxide capture while simultaneously forming cement.

In a further example embodiment, as illustrated in FIG. 4, calcination for cement production can be provided with carbon capture through reactor operation with clinker integration. As seen in FIG. 4, calcination for cement production can be carried out wherein CaO in line 207 is sent to a clinker unit 270 together with fuel in line 243, oxidant in line 241b (with oxidant passing to the reactor 200 through line 241a), and clinker additives in line 271 (e.g., sand, coal ash, etc.). The operating temperature of the clinker unit 270 can be in the range of about 1200° C. to about 1500° C. or about 1300° C. to about 1400° C. A solids stream comprising cement clinker can exit the clinker unit 270 through line 272 and can be cooled in the clinker cooler unit 275 before exiting as cooled cement clinker in line 276. A flue gas exiting the clinker unit 270 in line 273 can be sent back to the reactor 200 for use as the oxidant stream. As such, oxygen from the VPSA 240 (or a different oxygen source) can be blended with the flue gas in line 273. Accordingly, line 273 and line 241 may combine prior to entry into the reactor 200. The clinker unit 270 can be cooled by partially compressed, recycled $CO_2$ in line 222 from the compressor 220 in a clinker cooler unit 275. The warm $CO_2$ gas in line 277 from the clinker cooler unit 275 can be sent back to the primary heat exchanger network 210 for heat recuperation, then it may be mixed with the calciner flue gas and enter the water separator 215 through line 211. Alternatively, the clinker 270 can be operated in air-combustion mode, and the $CO_2$ from the clinker flue gas can be captured in a carbonator as otherwise described in previous example embodiments. The remaining components in FIG. 4 may be configured for operation substantially as described in relation to FIG. 2 and/or FIG. 3.

Figure 5:
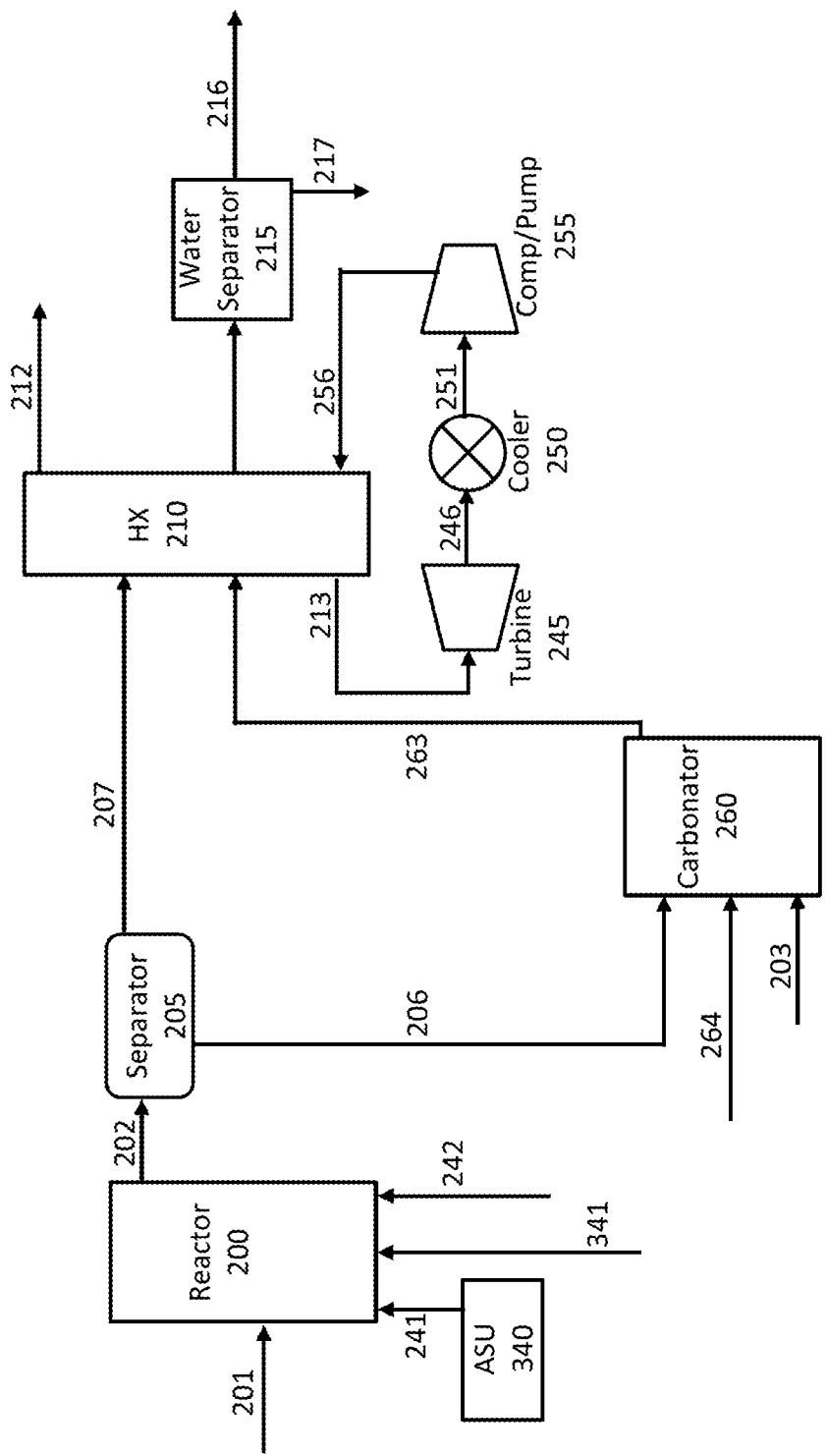
FIG. 5 is a flowchart illustrating a process according to an example embodiment of the present disclosure whereby limestone can be processed to make quicklime with power production, carbon dioxide capture, and mineral sequestration of at least a portion of the carbon dioxide.

In a further example embodiment, as illustrated in FIG. 5, kiln operation can be carried out with carbon capture and mineral sequestration. In this example embodiment, an oxygen-enriched calcination process is integrated with a $CO_2$ mineral sequestration ($Mg_3Si_2O_5(OH)_4 + 3CO_2 = 3MgCO_3 + 2SiO_2 + 2H_2O$). Limestone is passed to the reactor 200 in line 201 along with oxygen in line 241 from an ASU 340, air in line 341, and fuel in line 242. The reaction exhaust in line 202 is passed through the separator 205. Separated CaO in line 207 can be sent to a heat exchanger 210 for heat recuperation before being exported in line 212. The flue gas in line 206 from the separator 205 at a temperature of about 900° C. can be sent to a carbonator 260 along with an industrial flue gas in line 203 reacting with magnesium silicate from line 264 for $CO_2$ mineral sequestration. $CO_2$ lean flue gas in line 263 from the carbonator at around 650° C. can be cooled in the heat exchanger 210 down to near ambient temperature before passing through the water separator 215. Water can exit in line 217 with the dry flue gas venting in line 216. The high grade heat can be used for preheating the inlet streams of the calciner reactor 200 and/or the carbonator 260, or for power generation and eventual $CO_2$ cleanup of residual content that still may exist in the flue gas.

Figure 6:
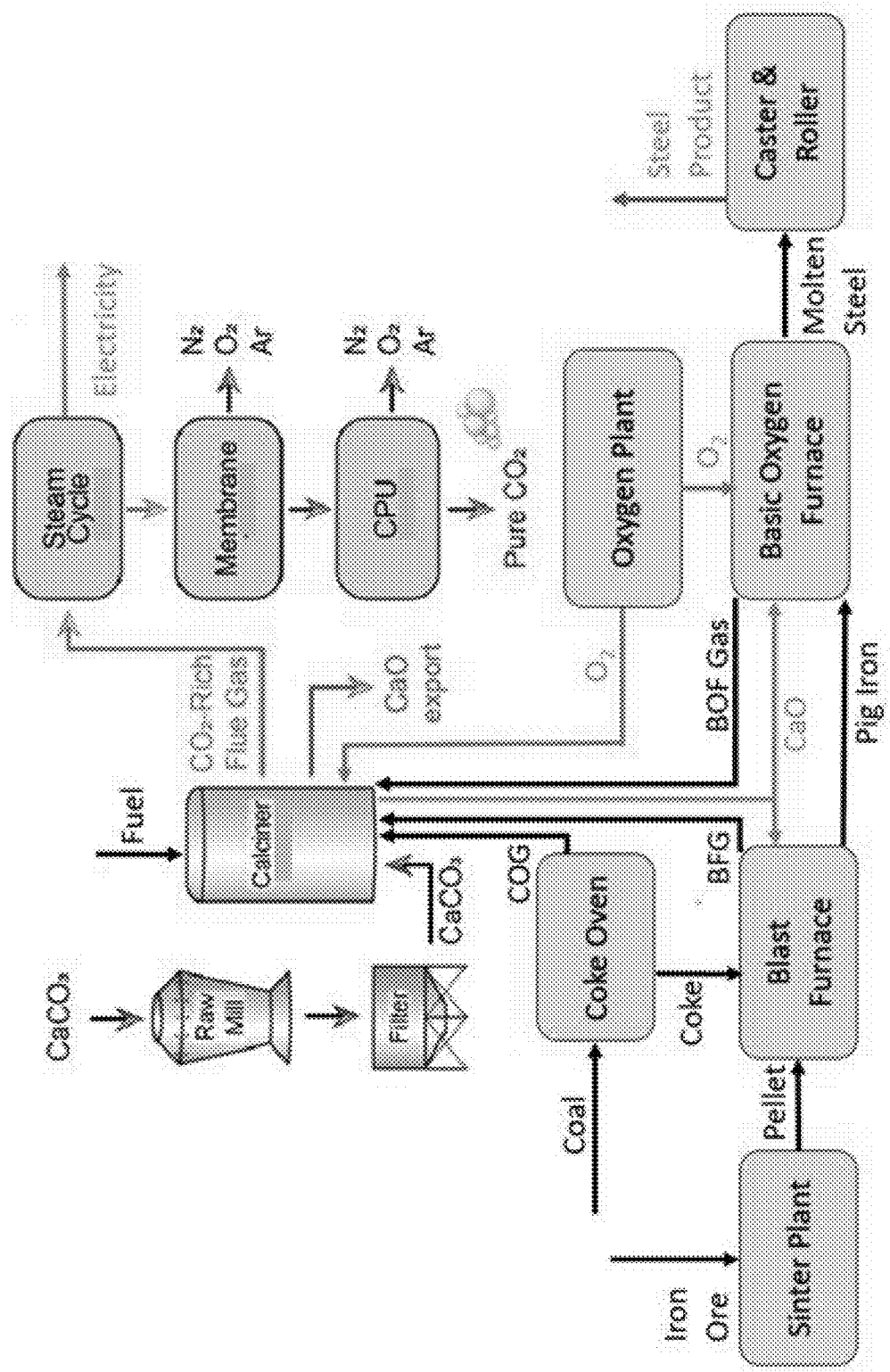
FIG. 6 is a flowchart illustrating a process according to an example embodiment of the present disclosure whereby limestone can be processed to make quicklime with power production and carbon dioxide capture while simultaneously forming steel.

In another example embodiment, as seen in FIG. 6, the present systems and methods may be integrated with one or more steelmaking operations. Accordingly, a system as described herein may be integrated into a steelmaking plant and/or a method as described herein may be integrated into a steelmaking process. As shown, steel making processes can generate a plurality of different flue gas streams which can often be rich in carbon dioxide content. Like with power plant flue gas streams, various steel making flue gases may have an oxygen content and thus may be provided to the reactor of the present disclosure for use as an oxidant. Additionally, some steel making flue gases may contain fuel content and thus may be added to the present reactor as an optional fuel source. Off gas streams, such as those coming from a basic oxygen furnace, may be used to supplement the fuel injection of the reactor.

As shown in FIG. 6, calcium carbonate (limestone) may be milled through a raw mill and optionally filtered to a substantially uniform particle size before being injected to a calciner reactor as described herein. Further inputs to the calciner reactor may include a fuel in a fuel line, oxidant (e.g., oxygen from an oxygen plant or other oxygen source), and one or more gas streams. For example, coke oven gas may be passed through a line from a coke oven that is configured to burn coal to form coke to be input to a blast furnace and, likewise, blast furnace gas may be passed through a line from a blast furnace to the calciner reactor. Similarly, basic oxygen furnace gas from a basic oxygen furnace may be passed through a line to the calciner reactor.

Exiting the calciner reactor can be one or more of a $CO_2$ rich flue gas in a gas line and solids (e.g., calcium oxide) that can be provided through one or more solids line(s). For example, quicklime may be provided for export. Alternatively, or additionally, quicklime may be provided to one or both of the blast furnace and the basic oxygen furnace. The gas line may proceed to a steam cycle or another power cycle that can be utilized for power production (e.g., electricity). Gas exiting the power cycle can be processed through one or more further units as described herein (e.g., a separation membrane or a cryogenic separation unit) to provide substantially pure carbon dioxide for CCUS and optionally to provide one or more further gases, such as nitrogen, oxygen, and argon. The present systems and methods particularly are integrated directly with the steelmaking system/method in relation the mutual use of various streams as noted above. In the steelmaking process, iron ore can be input to a sintering plant to provide iron pellets that can be processed through a blast furnace to form pig iron. The pig iron can be processed through a basic oxygen furnace to provide molten steel, which can then be processed through a caster & roller unit to provide the steel product(s). In such integrated systems/processes, one or more units from the steelmaking system can provide one or more streams that can be input to the present reactor. Likewise, the present reactor can output one or more streams that can be used as one or more inputs into one or more units of the steelmaking system. In this manner, carbon dioxide can be captured without penalty.

It is understood that any of the components illustrated in relation to FIGS. 1A through 5 may be included in the systems and methods illustrated in relation to FIG. 6. For example, although a calciner is shown in FIG. 6, it is understood that the calciner indicates that a reactor as described herein may be utilized, and this may include a plurality of reactors. Further, since both a flue gas and solids streams are illustrated exiting the calciner, it is understood that the illustrated calciner indicates that at least one separation component is integrated therewith for separation of the gases from the solids. Likewise, it is understood that the reactor(s) and the separator(s) may be an integrated unit or may be separate units. Additionally, it is understood that the "steam cycle" illustrated in FIG. 6 is indicative of a plurality of components that are utilized for producing electricity. Referring to FIG. 1A and FIG. 1B, the steam cycle of FIG. 6 may include an HRSG 30 that can be used to heat a water stream 9 and produce a steam stream 8 that can be cycled through suitable turbines for production of electricity utilizing suitable generators. Referring to FIG. 2, the steam cycle of FIG. 6 may include a heat exchanger 210, a turbine 245 (and any necessary generators), a cooler 250, a compressor/pump unit 255, and lines 256 and 213 for circulation of a working fluid. It is likewise understood that, in such embodiments, the working fluid need not necessarily be water/steam, and the phrase "steam cycle" can simply indicate power generation through circulation of a working fluid.

In a further example embodiment, reactor operation may be carried out with integration of an alkali solvent-based direct air capture system. Such systems and methods can use, for example, KOH, NaOH, or other alkali liquid based solvents to capture $CO_2$ (or other moieties) from gaseous mixtures, such as air and/or the flue gas from an air combustion process. In one or more embodiments, such capture can arise through the following reaction:

$$2KOH + CO_2 = H_2O + K_2CO_3. \tag{1}$$

KOH can be regenerated through a calcium looping process or cycle as shown below.

$$K_2CO_3 + Ca(OH)_2 = 2KOH + CaCO_3 \tag{2}$$

$$CaCO_3 = CaO + CO_2 \tag{3}$$

$$CaO + H_2O = Ca(OH)_2 \tag{4}$$

Direct air capture systems can require electricity to run an air capture reactor, $CO_2$ compressors, and other equipment. Such systems also require low grade heat for steam generation for a $CaO/H_2O$ reaction and high grade heat (e.g., around at least 900° C.) for a $CaCO_3$ dissociation reaction. The electricity and heat for the air capture system may be produced by the proposed carbon capture kiln system. Such integration can be useful to improve the $CO_2$ capture efficiency and reduce the system cost. Examples of power production systems and methods which may be utilized in the present disclosure are provided in U.S. Pat. Nos. 8,596,075, 8,776,532, 8,869,889, 8,959,887, 8,986,002, 9,062,608, 9,068,743, 9,410,481, 9,416,728, 9,546,815, 10,018,115, and U.S. Pub. No. 2012/0067054, the disclosures of which are incorporated herein by reference. Such systems particularly can utilize $CO_2$ as the working fluid to produce power and heat with full carbon capture.

$CaCO_3$ from within the calcium looping cycle can be added to fresh $CaCO_3$ feedstock and decomposed into CaO and $CO_2$ in a reactor operated at a temperature of about 900° C. to about 1100° C.

Flue gas from the calciner reactor (e.g., comprising $CO_2$, $H_2O$, and other minor contaminants) can be cooled down to about ambient temperature for water and $CO_2$ separation. The heat in the calciner flue gas can be used to pre-heat $CaCO_3$ to about 600° C. to about 700° C. before $CaCO_3$ is injected into the calciner, and the heat can also be used for heating the closed loop power cycle working fluid to the turbine inlet temperature. Here, the working fluid can be steam, $CO_2$, supercritical $CO_2$, or other materials. After water separation, $CO_2$ can be compressed to high pressure and purified to a high purity by a $CO_2$ membrane and a cryogenic based $CO_2$ purification unit.

Flue gas from the calciner can be partially cooled to a range of about 300° C. to about 500° C. for $CaCO_3$ preheating, then sent to a single stage or double stage oxy-fired gas re-heater with steam/$CO_2$ tubing inside to raise the temperature up to about 650° C. to about 700° C. for a closed loop power generation cycle. The export $CO_2$ can be used for EOR, chemical production, sequestration, and/or other uses.

CaO at about 900° C. in the calciner can be separated from a gas product via a separation unit and cooled downed to about 600° C. to about 700° C. against one or a combination of low temperature steam, oxidant, or $CO_2$, and hot CaO can also be cooled by mixing with low temperature, recycled CaO. The CaO at a temperature of about 600° C. to about 700° C. can be sent to a steam slaker to generate a stream of $Ca(OH)_2$. A portion of the CaO can be exported from the system as a byproduct. For example, the portion of the CaO can be sold as quicklime or hydrated lime by water slaking. The remaining portion of the CaO can be recycled within the chemical looping cycle.

CaO can be sent to a steam slaker to form $Ca(OH)_2$ by reacting with steam. The heat released by the reaction in the steam slaker can be used to directly pre-heat $CaCO_3$ slurry and/or indirectly heat the closed loop power cycle working fluid, such as steam or $CO_2$. The steam slaker can be operated, for example, at a temperature of about 150° C. to about 500° C.

High temperature CaO exiting the steam slaker can be cooled down to the ambient temperature and form a CaO water slurry. The heat withdrawn from the high temperature CaO can be used to pre-heat the closed looping power cycle working fluid.

A CaO water slurry can be sent to a reactor for $CO_2$ solvent regeneration, such as by reacting with $K_2CO_3$ or $Na_2CO_3$, to form $CaCO_3$ and KOH or NaOH. The reaction with $K_2CO_3$ is shown below.

$$K_2CO_3 + Ca(OH)_2 = 2KOH + CaCO_3 \qquad (5)$$

Liquid KOH or NaOH can be used for capturing $CO_2$ from a gaseous sample (e.g., air or flue gas) by spraying the liquid solvent to make contact with the air in, for example, an air contactor. The subsequent reaction with KOH is shown below.

$$2KOH + CO_2 = H_2O + K_2CO_3 \qquad (6)$$

Air can be preheated for partial $CO_2$ removal by using a solid state $CO_2$ absorbent running at a temperature of about 130° C. to about 150° C. In some embodiments, the low grade heat for the process can be taken from the turbine exhaust stream or ASU heat from the oxy-fired power cycle.

$K_2CO_3$ and/or $Na_2CO_3$ from the air contactor can be sent to the CaO slurry reactor for KOH/NaOH regeneration. $CaCO_3$ from the CaO slurry reactor can be sent to steam slaker for preheating and then sent to the oxy-fired calciner for CaO regeneration.

A closed loop power cycle can be used for the power generation to self-supply the power for part of the system or substantially the entire system. The heat for the closed loop power cycle can be, for example, from the calciner and/or the steam slaker. The working fluid can be steam, $CO_2$, or other materials.

Steam, air, or calciner flue gas $CO_2$ can be recycled back to the calciner reactor as a temperature moderator and fluidization medium.

The calciner reactor and/or steam slaker can be a circulating fluidized bed reactor, a transport reactor, or a bubbling bed reactor, horizontal or vertical kiln, or indirect heated kiln.

The CaO slurry pellet reactor can be any reactor, such as a fluidized bed reactor (used in other direct air capture cycles) or a constant stirred reactor.

A system for direct atmospheric capture of a moiety, such as $CO_2$, can comprise a number of components, units, or other elements. The integrated power production system can include, for example, at least one heat source (e.g., a combustor, a solar heater, heat transfer from a steam stream), at least one power producing turbine, at least one generator, at least one heat exchanger, at least one separator, at least one compressor and/or pump, and any number of lines useful for passage of various streams between said components, units, or elements.

The direct atmospheric capture system can include, for example, at least one air contactor unit, at least one pump/compressor, at least one reactor, at least one lime slaking unit (e.g., a steam slaker), at least one calciner, one or more mixing tanks, one or more heat exchangers, one or more coolers, and any number of lines useful for passage of various streams between said components, units, or elements. An air separation unit may also be included in the combined system.

It is understood that the alkali liquid solvent based direct atmospheric capture system can be combined with the CaO cogeneration and/or the integrated power production system in that one or more streams passing through one or more lines may be integrated into at least two of the noted systems. In this manner, for example, heat produced in one system may be transferred for use in the other system. Likewise, electricity generated in the power production system may be directly utilized by the direct atmospheric capture system. The present systems and methods thus benefit from the one or more outputs (e.g., CaO, $Ca(OH)_2$, and the like) being useful as commodities to offset the cost associated with direct air capture. Moreover, the present systems and methods may be combined with existing CaO production systems to create an overall carbon neutral facility. Even further, the ability to utilize heat generated in the calcium looping process to provide at least part of the heating for the closed loop power production cycle can provide for high efficiency, particularly in light of the ability to substantially or completely eliminate the need for $CO_2$ capture from the power production system and/or the CaO generation process.

The present systems and methods are beneficial at least in part because of the ability to utilize substantially carbon free power in carrying out direct air capture of one or more moieties therefrom. By eliminating emissions associated with power production it is possible to increase the effective amount of air capture achieved relative the actual capital expense investment since there is no additional cost for handling power plant emissions. Furthermore, the heat integration that is enabled between the air capture system and the power plant results in a net improvement in energy use per unit of carbon captured since more electricity can be produced. This synergy is based on the integration of heat recovery given the regeneration of CaO and not the use of the caustic capture agent.

In one or more embodiments, the present disclosure can relate to a system configured for alkali liquid solvent based direct air capture of one or more moieties (e.g., $CO_2$) with one or both of simultaneous power production and CaO generation. Such systems can comprise, for example: an air capture plant; a calciner; at least one heat recovery unit; and a closed loop power generation unit. The air capture plant can be configured for utilizing a caustic agent for reacting with the one or more moieties in an air stream, such as according to reaction 1 shown above. The calciner can be configured for regeneration of the caustic agent, such as according to a calcium looping cycle as described above. The at least one heat recovery unit can include one or more components configured for cooling of recovered solids and gases from the calciner and may include, for example, a steam slaker. The closed loop power generation unit can include components as otherwise described herein and may include minimally at least one or more heat recovery turbines and optionally one or more heat exchangers, compressors, and/or additional heat sources.

In some embodiments, the present disclosure can relate to a method for alkali liquid solvent based direct air capture of one or more moieties (e.g., $CO_2$) with one or both of simultaneous power production and CaO generation. Direct air capture with simultaneous CaO production can be advantages because of the ability to utilize the heat generated in the processes for further purposes, such as to raise steam and produce the needed power. Heat sources in the process can include the flue gas from the calciner, heat generated in the steam slaker, heat from an ASU, and/or heat from a turbine exhaust in the closed loop power cycle. The method can comprise, for example, contacting air (or another gaseous stream) with a caustic agent that is effective to react with at least one moiety (e.g., $CO_2$) in the air or other gaseous stream and thereby remove at least a portion of the at least one moiety from the air or other gaseous stream. The method thereafter can comprise regenerating the caustic agent to form at least one stream comprising at least CaO and the at least one moiety, whereby said regenerating includes heat production. The method also can comprise recovering at least a portion of the heat produced in the regenerating and applying the recovered heat to a closed loop power production cycle. The method thus can result in the capture of the at least one moiety that is removed from the air or other gaseous stream as well as the production of at least on commodity, such as the CaO.

In one or more embodiments, the present disclosure can provide for carbon capture along with coal combustion residuals (CCR) recycling. More particularly, the disclosure can provide systems and methods providing integration between a calcium oxide generation process, carbon dioxide capture and purification, and CCR treatment, as well as beneficial uses of end products. A flowchart illustrating various embodiments of such systems and methods is shown in FIG. 7.

Figure 7:
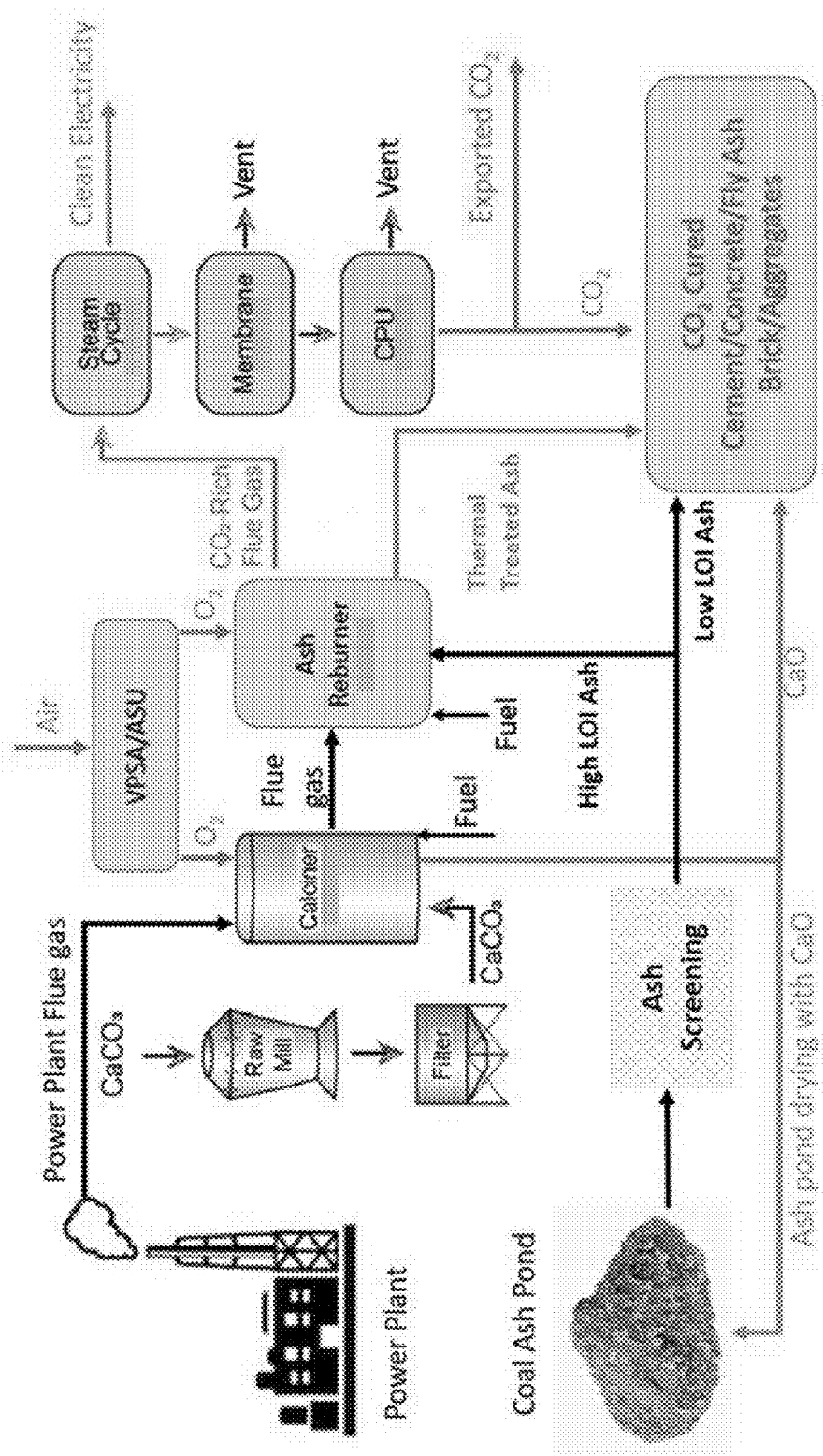
FIG. 7 is a flowchart illustrating a process according to an example embodiment of the present disclosure whereby carbon capture and coal combustion residuals (CCR) recycling may be carried out.

Referring to FIG. 7, a commercially available reactor for calcium oxide (CaO) production can be utilized as the calciner reactor. An oxidant stream can be pre-heated against export, hot CaO particles inside of the reactor before being injected into a combustion zone to combust fuel (e.g., coal, natural gas or other fuel as described herein). The oxidant stream can be through a line in the form of power plant flue gas that can be supplemented with pure oxygen that can be provided through the same or a different line in order to achieve stable combustion (increase $O_2$ mole fraction) at the burner of the reactor. The oxygen can be sourced from an ASU, VPSA, or other oxygen source. The reactor can be operated at a temperature of about 900° C. (or other suitable temperature, such as described herein). At the outlet of the reactor, a cyclone can be used for gas and solids separation.

A portion of CaO produced from the reactor can be used for stabilizing and drying wet ponded CCR. As illustrated, the CaO is combined with wet coal ash in a coal ash pond to effect drying of the coal ash. Dried ponded CCR can be sent to a screening system (e.g. froth floatation) to separate CCR with high loss on ignition ("LOT") from CCR with low LOT. CCR with low LOT (e.g., having an LOT of less than 3-4%) combined with CaO produced from the reactor can be used for cement/concrete/fly ash production. CCR with high LOT can be sent to a CCR reburner (or ash reburner) for thermal treatment to reduce the carbon content in the CCR. The oxidant stream in the CCR reburner can be the high temperature reactor exhaust gas supplemented with pure oxygen in order to achieve stable combustion in the reburner. Fuel can be optionally injected into the reburner in case the carbon in the CCR is not sufficient for stable combustion. The CCR reburner can be designed, for example, as a fluidized bed combustor for treating CRR with a large particle size, or a cyclone furnace type burner for treating CCR with a small particle size, such as fly ash. Ammonia in CCR can be removed from the reburner.

CCR reburner flue gas exiting the cyclone can enter a heat recuperation step to preferably transfer as much of the remaining heat as possible to generate steam for power generation. The steam generated in the heat recuperator can be sent to power plant steam cycle to either increase the power output or reduce the fuel input of the power plant. This can have the net effect of allowing for flue gas carbon capture and CCR treatment without a reduction in power output from a co-located power plant. This type of treatment may likewise be employed in the integrated system/method illustrated in FIG. 6 in relation to the steelmaking process.

Once the CCR flue gas has been cooled to close to ambient for maximum heat recovery, it can enter a water separator to remove liquid water. One example configuration can include a wet venturi scrubber which can provide additional cooling and also assist in dissolving acid gas chemistry into a liquid phase and removing any fine solids still entrained in the flue gas. The cooling medium for the scrubber can be condensed process water that can be temperature controlled via a dry cooling tower arrangement. Following water separation, the cooled gas can enter a compressor. Discharge pressure for the machine can be in the range of about 5 bar to about 15 bar.

Upon exiting the compressor, the flue gas can be cooled once again to near ambient temperature. Depending on the amount of SOx and NOx in the kiln flue gas, the flue gas can be optionally scrubbed by a water stream to remove residual SOx and NOx species in the forms of $H_2SO_4$ and $HNO_3$. This can be done under a pressurized oxidation environment via a catalytic oxidation process, commonly referred to as the "lead chamber" acid process, which has been further developed and demonstrated to be effective for the removal of these species from a pressurized oxidation working fluid.

The clean flue gas then can be sent to commercially available membrane assisted cryogenic type $CO_2$ Purification Unit (CPU) to provide clean captured $CO_2$ with over 99% purity. The membrane design can provide at least 90% bulk recovery of the input $CO_2$ as part of the permeate product with a $CO_2$ concentration no lower than 50%. Next, the permeate flow can enter a carbon dioxide purification unit (CPU) in which the contaminated $CO_2$ stream (permeate stream) can be purified to desired level of downstream application via a cryogenic separation process. The CPU unit, as an example, can comprise a feed compressor to raise the pressure of the processing $CO_2$ stream to enhance the liquefaction of carbon dioxide. The membrane unit and/or the CPU illustrated in relation to FIG. 6 and/or FIG. 7 can be as otherwise described herein in relation to acid gas separation, and particularly carbon dioxide separation.

The present systems and methods can be adapted to or configured to provide about 90% $CO_2$ capture, and the $CO_2$ can be, for example, from a power plant, a limestone calcination process, a fuel, and/or CCR combustion. Purified $CO_2$ can be exported for sequestration, EOR, and/or chemical production to increase revenue and claim $CO_2$ tax credits, such as 45Q. Thermally treated CCR can be combined with CaO produced from the calciner to make cement, concrete, fly ash brick, and other materials by adjusting the mixing ratio between thermal treated CCR and CaO. In addition, captured $CO_2$ from the present systems and methods can be used to cure concrete and fly ash brick co-produced in the same system, reduce curing time, and realize on site $CO_2$ mineral sequestration.

The above-described systems and methods can provide a plurality of advantages and beneficial uses. In some embodiments, the systems and methods can provide an integrated solution of managing various wastes from coal power plants. For example, CaO produced from the present systems can be used for wet pond drying and stabilization and also can be combined with thermal treated CCR to produce salable by-products, including cement, concrete, fly ash bricks, and others. $CO_2$ produced from power plants and the present systems can be internally captured and can be on-site mineral sequestered via $CO_2$ curing concrete and fly ash bricks. Thermal treatment of the CCR in some embodiments can take place in the same reactor where the CaO is produced. In such a scenario, loss of ignition carbon content in the CCR may serve to offset fuel input into the reaction vessel. As well, the CCR can be fed to the reactor in a ratio with the CaO that is formed such that the dried solid discharged mixture may embody a product comparable to cement.

In some embodiments, the systems and methods can provide in-situ SOx, NOx, particulates and soluble acid removal and coal ash treatment. For example, fuel and CCR derived impurities from natural gas or coal fired power plants, such as SOx, NOx, $NH_3$, and fine particulates and soluble acid can be removed simultaneously in the present systems. Compounds such as calcium sulfate and calcium nitrate can be formed from the SOx and NOx as it comes in contact from cooling export CaO. The trace amount of fine particles, SOx, NOx and soluble acid, such as chlorine and ammonia in the kiln and CCR reburner flue gas leftover, can be removed in the downstream water separator. In addition, another use of the produced quicklime can be to combine with coal ash from existing coal plants to produce cement on-site by adding a cement clinker at the back end of the process.

In some embodiments, the systems and methods can provide flexible integration with existing flue gas streams. For example, as discussed above, other contaminants can be removed in the present systems, and $CO_2$ sorbent can be insensitive to the flue gas chemistry. The systems can be integrated with flue gas streams flexibly with little or no modification. For instance, coal flue gas entering into the present systems and methods can be either prior to or after Selected Catalytic Removal (SCR) unit or FGD units, which makes the system integration become relatively simple and low risk.

In some embodiments, the systems and methods can provide $CO_2$ capture with minimal parasitic load. For example, the kiln and CCR reburner exhaust heat can be used to generate steam, which can drive a steam turbine to generate power that offsets any parasitic loads associated with the present systems. As evidenced by detailed Aspen modeling of the present systems, minimal net electric demand is associated with such systems. Electricity generated from the kiln and CCR reburner heat can cover much of the parasitic load of post-combustion capture, CaO byproduct generation, and $CO_2$ cleanup and purification, and exact amounts can be affected by targeted capture rate. In addition, carbon in CCR can be used as fuel in the system to generate electricity and increase captured $CO_2$ output.

In some embodiments, the systems and methods can provide improved economics through production of by-product quicklime (CaO), thermal treated high quality CCR, cement, concrete, fly ash bricks, and $CO_2$. For example, the present system particularly can arise from an integration between low carbon quicklime generation processes, thermal treatment of CCR with high LOI, and power plant post-combustion carbon capture processes. The synergy between three different processes can be fully utilized to improve the economics of the carbon capture system and reduce net capture costs significantly. The revenue from various by-products generated from the present systems can CCR clean up from a cost center to a profit center.

In some embodiments, a CCR re-burner and a kiln can be one reactor. High LOI CCR and limestone thus can be co-injected into the combined reactor for combustion and calcination. The mass ratio of CCR and limestone can be utilized as a tuning parameter to define the CaO content in the treated CCR for different end uses.

It is understood that any of the components illustrated in relation to FIGS. 1A through 5 may be included in the systems and methods illustrated in relation to FIG. 7. For example, although a calciner is shown in FIG. 7, it is understood that the calciner indicates that a reactor as described herein may be utilized, and this may include a plurality of reactors. Further, since both a flue gas and solids streams are illustrated exiting the calciner, it is understood that the illustrated calciner indicates that at least one separation component is integrated therewith for separation of the gases from the solids. Likewise, it is understood that the reactor(s) and the separator(s) may be an integrated unit or may be separate units. Additionally, it is understood that the "steam cycle" illustrated in FIG. 7 is indicative of a plurality of components that are utilized for producing electricity. Referring to FIG. 1A and FIG. 1B, the steam cycle of FIG. 7 may include an HRSG 30 that can be used to heat a water stream 9 and produce a steam stream 8 that can be cycled through suitable turbines for production of electricity utilizing suitable generators. Referring to FIG. 2, the steam cycle of FIG. 7 may include a heat exchanger 210, a turbine 245 (and any necessary generators), a cooler 250, a compressor/pump unit 255, and lines 256 and 213 for circulation of a working fluid. It is likewise understood that, in such embodiments, the working fluid need not necessarily be water/steam, and the phrase "steam cycle" can simply indicate power generation through circulation of a working fluid.

In some embodiments, the systems and methods can provide carbon capture from flue gas, CCR, and the quicklime/cement industry in one system. For example, the present systems and methods can capture $CO_2$ from existing flue gas streams and decarbonize quicklime, fly ash bricks, cement, and CCR cleanup in a combined system. Total emissions from the cement industry contributes approximately 8% of global $CO_2$ emissions. The majority of $CO_2$ emissions from cement are process emissions ($CaCO_3=CaO+CO_2$) and fossil fuel combustion for calcination. The present systems and methods thus can be effective to substantially decarbonize the cement industry by capturing $CO_2$ from quicklime generation and from cement flue gas in an integrated system.

In some embodiments, sour gas (e.g., natural gas containing $H_2S$ and $CO_2$) can be the fuel fed into the reactor, and limestone can be injected into the reactor to capture sulfur species in the reactor and form gypsum (via the reaction of $CaCO_3+SO_2=CaSO_4+CO_2$). The sulfur lean reactor flue gas can enter a downstream heat recuperator, water separator, and membrane assisted $CO_2$ separation and purification unit to produce carbon captured power using sour gas as the feedstock. The gypsum can be separated out in the solids stream, and gypsum can be recovered for export and/or for combination with quicklime in a cement production process.

Systems as described herein can utilize commercially available equipment, including a direct-fired rotary kiln system for quicklime generation, fluidized bed combustor or cyclone furnace for CCR reburn, waste heat recuperator for steam generation, a downstream $CO_2$ membrane separator, as well as cryogenic type $CO_2$ purification unit (CPU). Example units/components that may be utilized include one or more of the following (in the singular or in multiples): kiln(s)/reactor(s); air blower(s); fluidized bed combustor(s); heat recovery steam generator(s) (HRSG); steam turbine(s); BFW pump(s); coalescing filter(s)/dryer(s); compander(s); integrally geared compressor(s); $CO_2$ separation membrane (s); $CO_2$ purification unit(s); vacuum condenser(s); and/or evaporative cooling tower(s).

In further embodiments, a direct capture system according to the present disclosure may partially or completely exclude the use of alkali liquid solvents based on KOH/NaOH. For example, at least a portion of any lime present in the system may serve as the agent directly capturing carbon dioxide from a gaseous stream. By adding CaO to an aqueous solution, the pH of said solution can be increased due to the increasing alkalinity. This in effect can create a buffering capacity against acidity. Should a gaseous stream containing carbon dioxide be contacted with the alkaline water mixture, it will promote the dissolution of carbon dioxide into the liquid phase. The carbon dioxide will dominantly appear in the solution as stable bi-carbonate and carbonate species. The solution thereafter may be disposed of as appropriate.

As a non-limiting example, in the enhanced oil recovery (EOR) industry, carbon dioxide that is captured during the production of CaO can be injected into an EOR well. Oil and produced water come to the surface while the carbon dioxide remains in the well and is substantially sequestered. The oil and water can be separated and, thereafter, the water can be mixed with the produced CaO. The mixture then can be contacted with either air and/or some other carbon dioxide containing flue gas until it is saturated with bi-carbonate/carbonate. The mixture then can be pumped into a disposal well. In another example, the CaO may simply be dumped in a body of water such as the ocean.

An advantage to this type of carbon capture is that it can function as a carbon negative arrangement. For every mole of CaO produced, less than two moles of $CO_2$ will be generated; however, the CaO in aqueous solution can capture 2 moles of $CO_2$, thus resulting in a net $CO_2$ capture.

Use of the words "about" and "substantially" herein can indicate that while the exact values disclosed are encompassed, the present disclosure likewise encompasses slight variations therefrom. Thus, a value indicated as being "about" the stated amount or "substantially" the stated amount includes the stated amount as well as variations therefrom that may be expected to occur in relation to other processing conditions, equipment limitations, and/or inability in the field to exact measure the noted value. "About" and/or "substantially" thus can encompass variations of +/−5%, +/−2%, or +/−1% of the exact, stated value.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for calcination with carbon capture, the method comprising:
  processing a carbonate-containing raw material in a heated reactor to provide a decomposition stream comprising at least solids and carbon dioxide gas, the reactor being heated through combustion of a fuel in the reactor with an oxidant, wherein the oxidant comprises a flue gas;
  separating the decomposition stream in a separation unit into a gas stream including the carbon dioxide and a solids stream;
  cooling one or both of the gas stream including the carbon dioxide and the solids stream in a heat exchanger;
  one or both of providing at least a portion of the solids stream as a product for export and delivering at least a portion of the solids stream to a further reactor for forming a secondary product; and
  purifying the gas stream including the carbon dioxide to provide a substantially pure stream of carbon dioxide for export.

2. The method of claim 1, wherein the reactor is operated at a pressure of about 1.5 bar to about 8 bar.

3. The method of claim 1, wherein the reactor is operated at a temperature of about 850° C. to about 1100° C.

4. The method of claim 1, wherein the heated reactor and the separation unit are an integral unit.

5. The method of claim 1, wherein the heat exchanger is one or more of a heat recovery steam generator (HRSG), a gas heated reformer (GHR), or a recuperative heat exchanger.

6. The method of claim 1, wherein the gas stream including the carbon dioxide is cooled in the heat exchanger to a temperature of about 20° C. to about 150° C.

7. The method of claim 6, further comprising passing the gas stream including the carbon dioxide exiting the heat exchanger through one or more water removal units to provide a dried gas stream including the carbon dioxide.

8. The method of claim 7, wherein purifying the gas stream including the carbon dioxide comprises passing the gas stream including the carbon dioxide through at least one membrane separation stage configured to separate the gas stream including the carbon dioxide into a $CO_2$ lean stream and a $CO_2$ rich stream.

9. The method of claim 8, further comprising passing at least the $CO_2$ rich stream through a low temperature $CO_2$ purification unit.

10. The method of claim 8, further comprising compressing the gas stream including the carbon dioxide upstream from the at least one membrane separation stage.

11. The method of claim 10, further comprising expanding at least the $CO_2$ rich stream downstream from the at least membrane separation stage.

12. The method of claim 8, wherein the at least membrane separation stage is configured to provide at least 50% bulk recovery of $CO_2$ from the gas stream including the carbon dioxide in the $CO_2$ rich stream.

13. The method of claim 12, wherein the $CO_2$ rich stream has a $CO_2$ concentration no lower than 50%.

14. The method of claim 1, further comprising carrying out a power production cycle that is integrated with the heat exchanger.

15. The method of claim 14, wherein the power production cycle comprises compressing a working fluid in a compression unit to provide a compressed working fluid, heating the compressed working in the heat exchanger, passing the compressed working fluid exiting the heat exchanger through a turbine to generate power and form an expanded working fluid, and passing the expanded working fluid back to the compression unit.

16. The method of claim 1, further comprising processing a portion of the solids stream exiting the separator in a carbonator.

17. The method of claim 16, wherein the carbonator is configured to provide a regenerated raw material, and wherein at least a portion of the regenerated raw material is recycled back to the reactor.

18. The method of claim 16, wherein the raw material is limestone ($CaCO_3$), and wherein the solids steam exiting the reactor comprises quicklime (CaO).

19. The method of claim 18, further comprising process a flue gas including carbon dioxide through the carbonator such that at least a portion of the carbon dioxide from the flue gas is reacted with the quicklime to form $CaCO_3$.

20. The method of claim 1, further comprising processing a portion of the solids stream exiting the separator in a clinker unit.

21. The method of claim 20, further comprising adding one or more raw materials effective for cement production into the clinker unit such that solids from the solids stream react with the one or more raw materials effective for cement production to form cement clinker.

22. The method of claim 21, further comprising passing the cement clinker through a clinker cooler unit so as to cool the cement clinker using a cooled portion of the gas stream including the carbon dioxide.

23. The method of claim 22, further comprising recycling at least a portion of a flue gas from the clinker unit back to the reactor.

24. The method of claim 1, further comprising integrating the method for calcination with carbon capture into a steel-making process.

25. The method of claim 1, further comprising injecting coal ash into one or both of the reactor and a separate burner.

26. The method of claim 25, further comprising recovering thermally treated coal ash from one or both of the reactor and the separate burner.

27. The method of claim 26, further comprising mixing at a least a portion of the thermally treated coal ash with quicklime.

28. The method of claim 1, wherein the heated reactor is heated by combustion of a fuel that comprises sour gas.

29. The method of claim 28, comprising reacting the sour gas in the reactor with $CaCO_3$ to form gypsum.

30. The method of claim 1, wherein the flue gas is from a different process.

31. The method of claim 1, wherein the flue gas is from a power production plant.

32. The method of claim 1, wherein the flue gas is from a separate industrial process that is optionally operated in combination with the calcination with carbon capture.

* * * * *